US012682795B2

(12) United States Patent
Wang et al.

(10) Patent No.: US 12,682,795 B2
(45) Date of Patent: Jul. 14, 2026

(54) DISPLAY APPARATUS AND IMAGE PROCESSING METHOD THEREOF AND IMAGE PROCESSING DEVICE THEREOF WITH SUPER-RESOLUTION FOR REGION OF INTEREST

(71) Applicant: Novatek Microelectronics Corp., Hsinchu (TW)

(72) Inventors: Hung-Ming Wang, Tainan City (TW); Sin-Hong Li, Changhua County (TW); Yi-Ting Chen, Changhua County (TW); Chih-Hung Kuo, Kaohsiung City (TW); Ting-Chou Tsai, Tainan City (TW)

(73) Assignee: Novatek Microelectronics Corp., Hsinchu (TW)

( * ) Notice: Subject to any disclaimer, the term of this patent is extended or adjusted under 35 U.S.C. 154(b) by 232 days.

(21) Appl. No.: 18/193,662

(22) Filed: Mar. 31, 2023

(65) Prior Publication Data

US 2024/0331592 A1    Oct. 3, 2024

(51) Int. Cl.
| | |
|---|---|
| *G06F 3/01* | (2006.01) |
| *G06F 3/02* | (2006.01) |
| *G06F 3/042* | (2006.01) |
| *G06F 3/14* | (2006.01) |
| *G06T 3/4053* | (2024.01) |
| *G09G 3/00* | (2006.01) |

(52) U.S. Cl.
CPC ............. *G09G 3/002* (2013.01); *G06F 3/013* (2013.01); *G06F 3/0227* (2013.01); *G06F 3/0425* (2013.01); *G06F 3/1423* (2013.01)

(58) Field of Classification Search
CPC .............................. G06F 3/013; G06T 3/4053
See application file for complete search history.

(56) References Cited

U.S. PATENT DOCUMENTS

| | | | |
|---|---|---|---|
| 2013/0301933 A1* | 11/2013 | Salvador ............... | G06T 3/4053 |
| | | | 382/263 |
| 2019/0026864 A1* | 1/2019 | Chen ...................... | G06T 3/4053 |
| 2023/0111826 A1* | 4/2023 | Kitamura .............. | G06T 19/006 |
| | | | 345/633 |

* cited by examiner

*Primary Examiner* — Sanghyuk Park
(74) *Attorney, Agent, or Firm* — JCIPRNET

(57) ABSTRACT

A display apparatus and an image processing method thereof are provided. The display apparatus includes a display panel and an image processing device. The image processing device receives a low-resolution image from a host. The image processing device tracks a user's gaze to define a region of interest (ROI). The image processing device performs a video super-resolution (VSR) reconstruction on an original ROI image corresponding to the ROI in the low-resolution image to generate a high-definition ROI image. The image processing device pastes the high-definition ROI image back to the ROI in the low-resolution image to generate a processed image. The image processing device controls the display panel to display the processed image.

36 Claims, 12 Drawing Sheets

DISPLAY APPARATUS AND IMAGE PROCESSING METHOD THEREOF AND IMAGE PROCESSING DEVICE THEREOF WITH SUPER-RESOLUTION FOR REGION OF INTEREST

BACKGROUND

Technical Field

The disclosure relates to an electronic apparatus, and more particularly to a display apparatus and its image processing method and image processing device.

Description of Related Art

In augmented reality (AR) or virtual reality (VR) application scenarios, the host provides image data to the AR (or VR) apparatus (i.e., the display device). The AR (or VR) apparatus may instantly display the corresponding image based on image data. To allow users to see realistic images, generally, the host transmits high-resolution images to the AR (or VR) apparatus, but the transmission of high-resolution images requires a higher transmission bandwidth.

In order to reduce the transmission bandwidth, the host transmits a low-resolution image to the AR (or VR) apparatus, and then the AR (or VR) apparatus restores the entire low-resolution image to a complete high-resolution image. Therefore, the AR (or VR) apparatus may display realistic images (high-resolution images) for the users. However, restoring the entire low-resolution image will spend unnecessary hardware resources on the restoration of non-target objects.

It should be noted that the content of the "BACKGROUND" section is used to help understand the disclosure. Some of the content (or all of the content) disclosed in the "BACKGROUND" section may not be known by those of ordinary skill in the art. The content disclosed in the "BACKGROUND" section does not mean that the content has been known to those with ordinary knowledge in the technical field before the application of the disclosure.

SUMMARY

The disclosure provides a display apparatus, an image processing method thereof, and an image processing device thereof to generate processed images more efficiently.

In an embodiment of the disclosure, the above display apparatus includes a display panel and an image processing device. The image processing device is coupled to the display panel. The image processing device receives a low-resolution image from a host. The image processing device tracks a user's gaze to define a region of interest (ROI). The image processing device performs a video super-resolution (VSR) reconstruction on an original ROI image corresponding to the ROI in the low-resolution image to generate a high-definition ROI image. The image processing device pastes the high-definition ROI image back to the ROI in the low-resolution image to generate a processed image. The image processing device controls the display panel to display the processed image.

In an embodiment of the disclosure, the image processing method is described below. A low-resolution image is received from a host. A user's gaze is tracked to define a ROI. A VSR reconstruction is performed on an original ROI image corresponding to the ROI in the low-resolution image to generate a high-definition ROI image. The high-definition ROI image is pasted back to the ROI in the low-resolution image to generate a processed image.

In an embodiment of disclosure, the image processing device includes an eye tracking circuit, a partition circuit, a VSR reconstruction circuit, and a stitching circuit. The eye tracking circuit is configured to track a user's gaze. The partition circuit is coupled to the eye tracking circuit. The partition circuit receives a low-resolution image from a host. The partition circuit defines a ROI based on a tracking result of the eye tracking circuit. The partition circuit partitions the low-resolution image into the original ROI image corresponding to the ROI and other region image apart from the original ROI image, the VSR reconstruction circuit is coupled to the partition circuit to receive the original ROI image. The VSR reconstruction circuit performs a VSR reconstruction on the original ROI image to generate a high-definition ROI image; and The stitching circuit is coupled to the partition circuit to receive the other region image and coupled to the VSR reconstruction circuit to receive the high-definition ROI image, The stitching circuit pastes the high-definition ROI image back to the ROI in the low-resolution image to generate a processed image.

Based on the above, the hosts of the embodiments of the disclosure may transmit low-resolution images to the display apparatus, so the transmission bandwidth between the host and the display apparatus may be effectively reduced. The display apparatus may track the user's gaze to define the ROI. The display apparatus may only restore the ROI image in the original low-resolution image to a high sharpness image (high-definition ROI image), but maintain the sharpness of the non-ROI image in the original low-resolution image. Thus, the display apparatus may produce processed images more efficiently.

In order to make the above-mentioned features and advantages of the disclosure comprehensible, embodiments accompanied with drawings are described in detail below.

DESCRIPTION OF THE EMBODIMENTS

Figure 1:
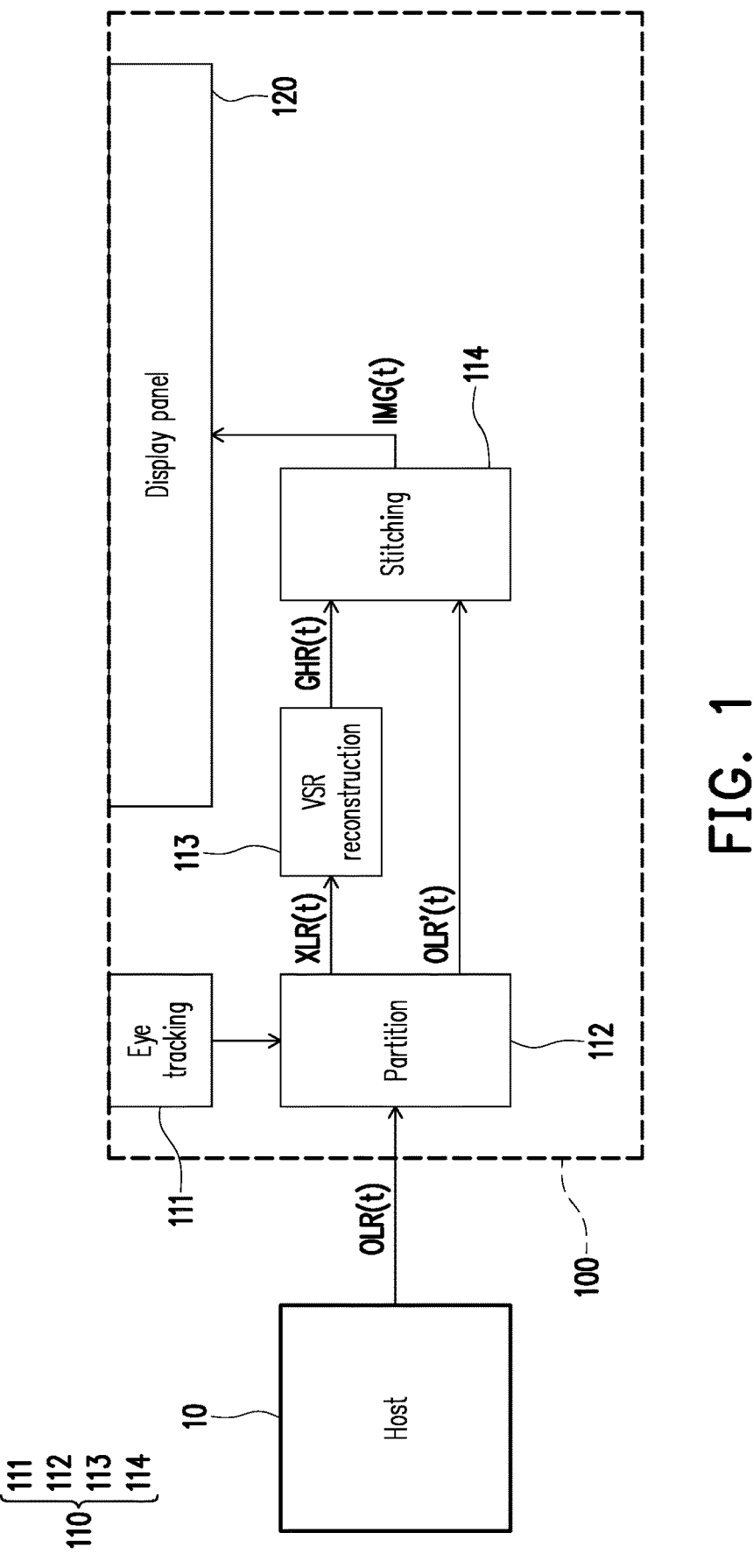
FIG. 1 is a circuit block schematic view of a display apparatus according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device can be directly connected to the second device, or the first device can be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a circuit block schematic view of a display apparatus 100 according to an embodiment of the disclosure. The display apparatus 100 may display a corresponding image based on image data provided by a host 10. Based on the actual design, the display apparatus 100 may be an augmented reality (AR) display device, a virtual reality (VR) display device or other display devices. The display apparatus 100 shown in FIG. 1 includes an image processing device 110 and a display panel 120. The image processing device 110 is coupled to the display panel 120. Based on the control of the image processing device 110, the display panel 120 may display an image.

Figure 2:
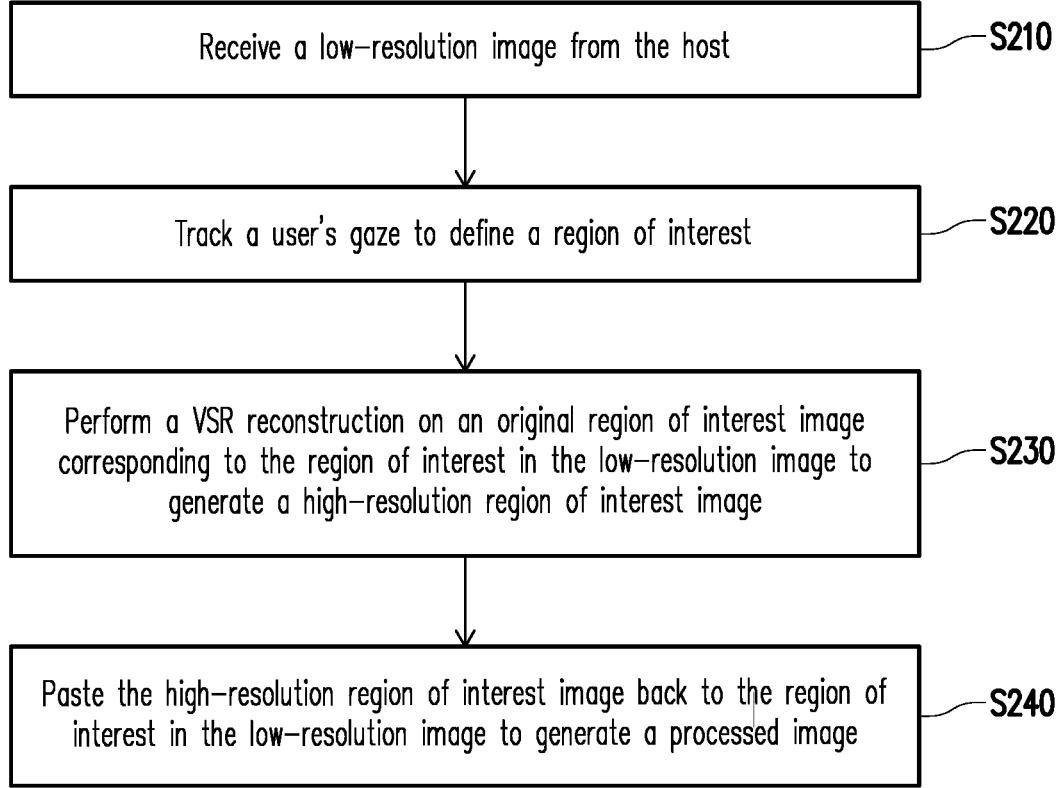
FIG. 2 is a flowchart of an image processing method of a display apparatus according to an embodiment of the disclosure.

FIG. 2 is a flowchart of an image processing method of a display apparatus according to an embodiment of the disclosure. Referring to FIG. 1 and FIG. 2, in step S210, the image processing device 110 may receive a low-resolution image OLR(t) (low-definition image) from the host 10. In step S220, the image processing device 110 may track a user's gaze, such as by performing eye tracking to define a region of interest (ROI). Then in step S230, the image processing device 110 may perform a video super-resolution (VSR) reconstruction on an original ROI image XLR(t) corresponding to the ROI in the low-resolution image OLR (t) to generate a high-definition ROI image GHR(t). The image processing device 110 may paste the high-definition ROI image back to the ROI in the low-resolution image OLR(t) to generate a processed image IMG(t). The image processing device 110 may control the display panel 120 to display the processed image IMG(t).

In some embodiments, the ROI may include multiple sub-regions of interest, that is, the high-definition ROI image GHR(t) may include multiple sub-ROI images. The image processing device 110 may define multiple sub-regions of interest based on a tracking result of the user's gaze. The image processing device 110 may perform VSR reconstruction on each of the sub-regions of interest in the low-resolution image OLR(t) to generate multiple sub-ROI images with different sharpness. The image processing device 110 may paste the sub-ROI images back to the sub-regions of interest in the low-resolution image OLR(t) to present a multi-layer progressive sharpness effect between the ROI and another region in the processed image IMG(t).

Figure 3:
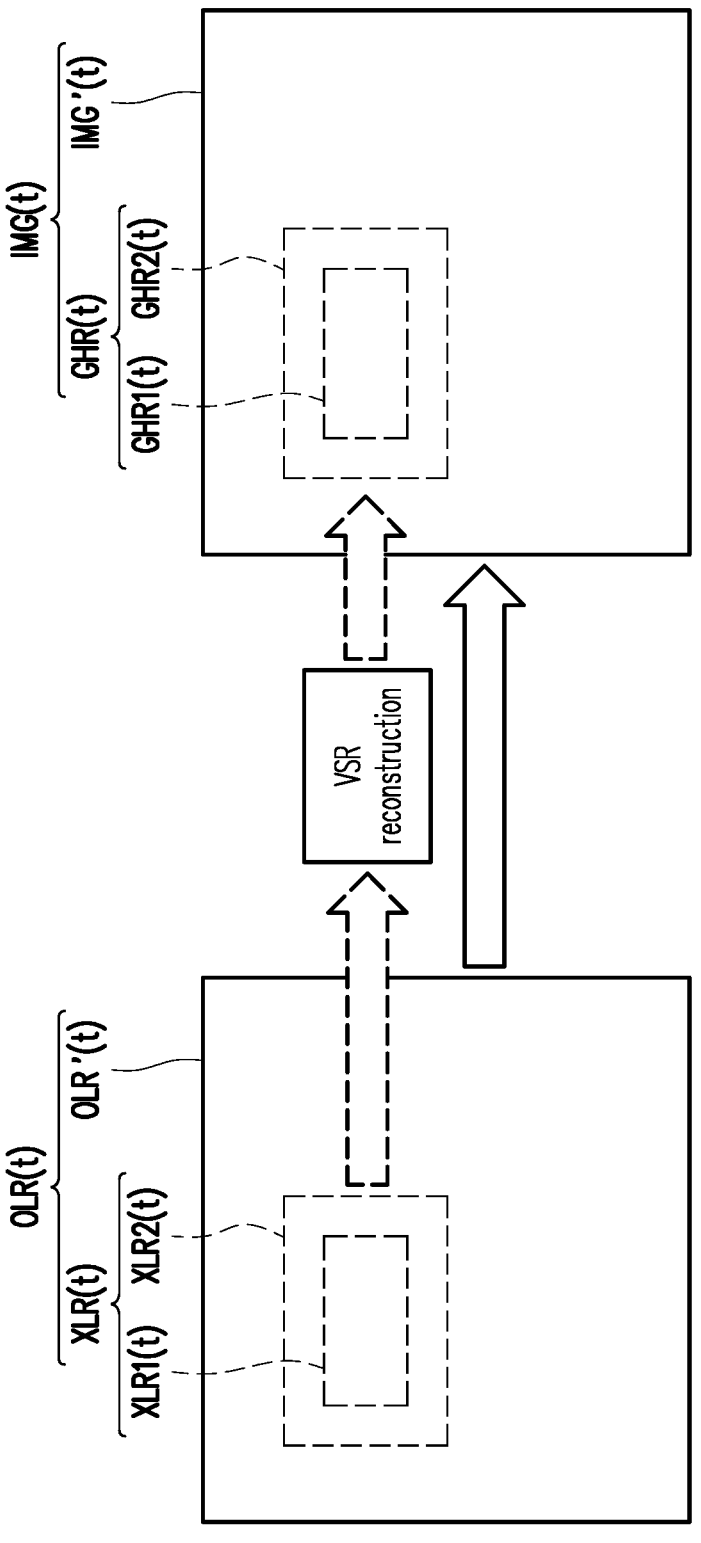
FIG. 3 is a schematic view of a scenario of performing VSR reconstruction on an original ROI image corresponding to a ROI in a low-resolution image according to an embodiment of the disclosure.

FIG. 3 is a schematic view of a scenario of performing VSR reconstruction on an original ROI image XLR(t) corresponding to a ROI in a low-resolution image OLR(t) according to an embodiment of the disclosure. The embodiment shown in FIG. 3 assumes that the ROI includes two sub-regions of interest. That is, the original ROI image XLR(t) in the low-resolution image OLR(t) may include the original sub-region images $XLR1(t)$ and $XLR2(t)$, and the high-definition ROI image GHR(t) may include multiple sub-ROI images $GHR1(t)$ and $GHR2(t)$. It should be noted that the amount of sub-ROI (original sub-region image) may be determined according to the actual design.

Referring to FIG. 1 and FIG. 3, the image processing device 110 may dynamically determine the position of the ROI (original ROI image XLR(t)) based on the tracking result of the user's gaze. The image processing device 110 may perform VSR reconstruction on each of the original sub-region images $XLR1(t)$ and $XLR2(t)$ corresponding to each of the sub-regions of interest in the low-resolution image OLR(t) to generate multiple sub-ROI images GHR1 $(t)$ and $GHR2(t)$ with different sharpness. For example, the sub-ROI image $GHR1(t)$ is the sharpest, while the sharpness of the sub-ROI image $GHR2(t)$ is between the sharpness of the sub-ROI image $GHR1(t)$ and other region image IMG'(t) in the processed image IMG(t). The other region image OLR'(t) in the low-resolution image OLR(t) does not undergo VSR reconstruction and becomes the other region image IMG'(t) in the processed image IMG(t). Thus, the sharpness of the other region image IMG'(t) in the processed image IMG(t) is approximately equal to the sharpness of the other region image OLR'(t) in the low-resolution image OLR(t). The image processing device 110 may paste the sub-ROI images $GHR1(t)$ and $GHR2(t)$ back to the sub-regions of interest in the low-resolution image OLR(t) to present a multi-layer progressive sharpness effect between the ROI and another region in the processed image IMG(t).

In the embodiment shown in FIG. 1, the image processing device 110 includes an eye tracking circuit 111, a partition circuit 112, a VSR (video super-resolution) reconstruction circuit 113, and a stitching circuit 114. According to different designs, in some embodiments, the image processing device 110, the eye tracking circuit 111, the partition circuit 112, the VSR reconstruction circuit 113, and (or) the stitching circuit 114 may be implemented using a hardware circuit. In other embodiments, the image processing device 110, the eye tracking circuit 111, the partition circuit 112, the VSR reconstruction circuit 113, and (or) the stitching circuit 114 may be implemented using a firmware, a software (i.e., a program), or a combination of the two. In some embodiments, the image processing device 110, the eye tracking circuit 111, the partition circuit 112, the VSR reconstruction circuit 113, and (or) the stitching circuit 114 may be implemented using a combination of hardware, firmware, and software.

In the form of hardware, the image processing device 110, the eye tracking circuit 111, the partition circuit 112, the VSR reconstruction circuit 113, and (or) the stitching circuit 114 may be implemented using a logic circuit on an integrated circuit. For example, the relevant functions of the image processing device 110, the eye tracking circuit 111, the partition circuit 112, the VSR reconstruction circuit 113, and (or) the stitching circuit 114 may be implemented in one or more controllers, microcontrollers, microprocessors, application-specific integrated circuits (ASIC), digital signal processors (DSP), field programmable gate arrays (FPGA), central processing units (CPU), and/or various logic blocks, modules, and circuits in other processing units. The relevant functions of the image processing device 110, the eye tracking circuit 111, the partition circuit 112, the VSR reconstruction circuit 113, and (or) the stitching circuit 114 may use hardware description language (e.g., Verilog HDL or VHDL), or other suitable programming languages to implement as a hardware circuit, such as various logic blocks, modules, and circuits in the integrated circuit.

In the form of software and/or firmware, related functions of the image processing device 110, the eye tracking circuit 111, the partition circuit 112, the VSR reconstruction circuit 113, and (or) the stitching circuit 114 may be implemented as programming codes. For example, the image processing device 110, the eye tracking circuit 111, the partition circuit 112, the VSR reconstruction circuit 113, and (or) the stitching circuit 114 are implemented using general programming languages (e.g., C, C++, or assembly language) or other suitable programming languages. The programming codes may be recorded/stored in a "non-transitory machine-readable storage medium". In some embodiments, the non-transitory machine-readable storage medium includes, for example, a semiconductor memory and (or) a storage device. The semiconductor memory includes a memory card, a read only memory (ROM), a flash memory, a programmable logic circuit, or other semiconductor memories. The storage device includes a tape, a disk, a hard disk drive (HDD), a solid-state drive (SSD), or other storage devices. The electronic apparatus (e.g., a computer, a CPU, a controller, a micro controller, or a microprocessor) may read and execute the programming codes from the non-transitory machine-readable storage medium, thereby, related functions of the image processing device 110, the eye tracking circuit 111, the partition circuit 112, the VSR reconstruction circuit 113, and (or) the stitching circuit 114 are implemented. Alternatively, the programming codes may be provided to the electronic apparatus via any transmission medium (e.g., communication network, radio waves, etc.). The communication network is, for example, the Internet, a wired communication network, a wireless communication network, or other communication media.

The eye tracking circuit 111 may use any eye tracking technology to track the user's gaze. For example (but not limited thereto), the eye tracking circuit 111 may use the pupil center corneal reflection (PCCR) technology. By calculating a gazing position of the pupils and a 3D model of the head, the eye tracking circuit 111 may calculate the position of human eyes gazing on the screen, so as to obtain the region where the user is interested in the image.

The partition circuit 112 is coupled to the eye tracking circuit 111. The partition circuit 112 receives the low-resolution image OLR(t) from the host 10. The partition circuit 112 defines the ROI based on the tracking result of the eye tracking circuit 111. The partition circuit 112 partitions the low-resolution image OLR(t) into the original ROI image XLR(t) corresponding to the ROI and other region image OLR'(t) apart from the original ROI image XLR(t). The VSR reconstruction circuit 113 is coupled to the partition circuit 112 to receive the original ROI image XLR(t). The VSR reconstruction circuit 113 performs VSR reconstruction on the original ROI image XLR(t) to generate a high-definition ROI image GHR(t).

The stitching circuit 114 is coupled to the partition circuit 112 to receive the other region image OLR'(t). The stitching circuit 114 is coupled to the VSR reconstruction circuit 113 to receive the high-definition ROI image GHR(t). The stitching circuit 114 pastes the high-definition ROI image GHR(t) back to the ROI in the low-resolution image OLR(t), that is, stitches the high-definition ROI image GHR(t) and the other region image OLR'(t) to generate the processed image IMG(t). The stitching circuit 114 may use any image stitching technology based on the actual design, so as to paste the high-definition ROI image GHR(t) back to the ROI in the low-resolution image OLR(t).

For example, taking the operation scenario shown in FIG. 3 as an example, the ROI includes multiple sub-regions of interest, the original ROI image XLR(t) includes multiple original sub-region images XLR1(t) and XLR2(t) corresponding to different sub-regions of interest, and the high-definition ROI image GHR(t) may include multiple sub-ROI images GHR1(t) and GHR2(t) corresponding to different sub-regions of interest. The partition circuit 112 defines multiple sub-regions of interest based on the tracking result of the eye tracking circuit 111. Based on the sub-regions of interest, the partition circuit 112 may partition the low-resolution image OLR(t) into the original sub-region images XLR1(t) and XLR2(t) corresponding to different sub-regions of interest and the other region image OLR'(t) apart from the original ROI image XLR(t). The VSR reconstruction circuit 113 performs VSR reconstruction on each of the original sub-region images XLR1(t) and XLR2(t) corresponding to different sub-regions of interest to generate sub-ROI images GHR1(t) and GHR2(t) with different sharpness. The stitching circuit 114 pastes the sub-ROI images GHR1(t) and GHR2(t) back to different sub-regions of interest in the low-resolution image OLR(t) to present a multi-layer progressive sharpness effect between the ROI and another region in the processed image IMG(t).

To sum up, the host 10 in the above embodiment may transmit the low-resolution image OLR(t) to the display apparatus 100, so the transmission bandwidth between the host 10 and the display apparatus 100 may be effectively reduced. The eye tracking circuit 111 of the display apparatus 100 may track the user's gaze to define the ROI. The display apparatus 100 may only restore the ROI image XLR(t) in the original low-resolution image OLR(t) to a high-resolution image (high-definition ROI image GHR(t)) and maintain the sharpness of the non-ROI image OLR'(t) in the original low-resolution image OLR(t). Thus, the display apparatus 100 may generate the processed image IMG(t) more efficiently.

Figure 4:
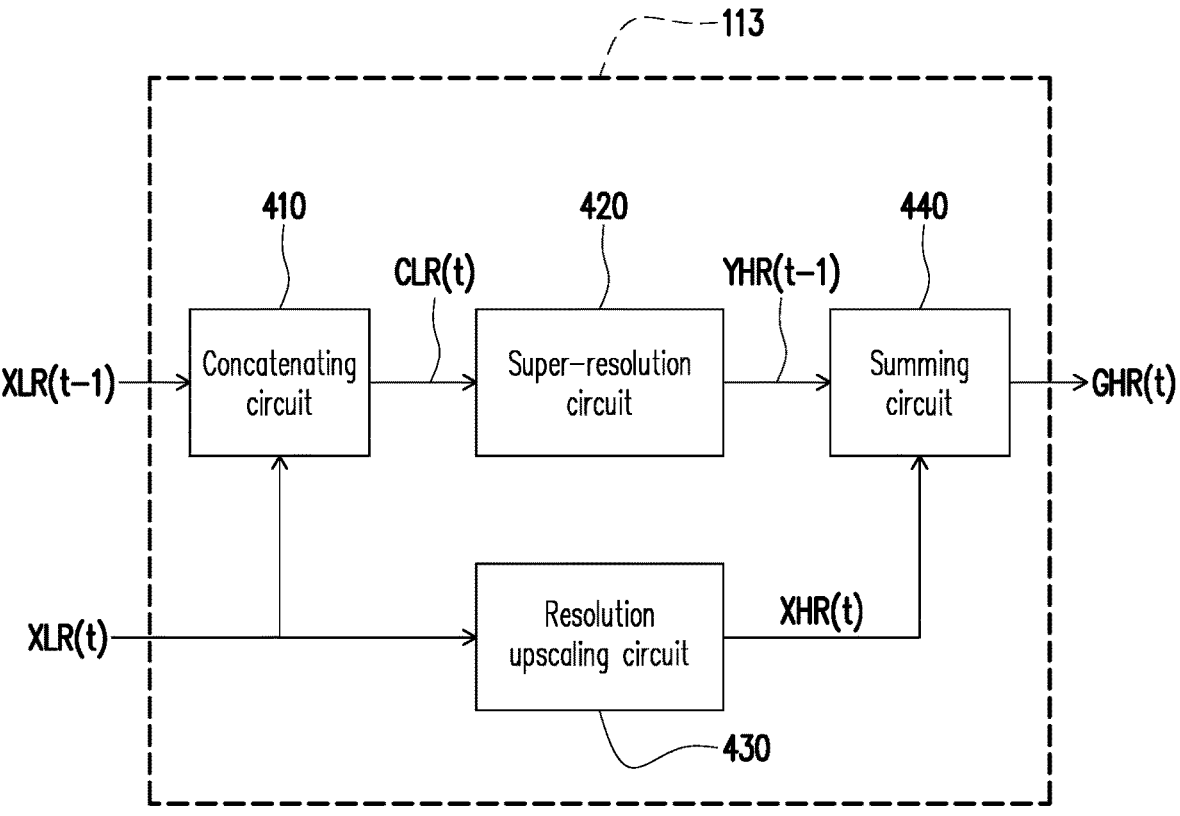
FIG. 4 is a circuit block schematic view of a VSR reconstruction circuit according to an embodiment of the disclosure.

FIG. 4 is a circuit block schematic view of a VSR reconstruction circuit 113 according to an embodiment of the disclosure. The VSR reconstruction circuit 113 shown in FIG. 4 may be used as one of many implementation examples of the VSR reconstruction circuit 113 shown in FIG. 1. In the embodiment shown in FIG. 4, the VSR reconstruction circuit 113 includes a concatenating circuit 410, a super-resolution circuit 420, a resolution upscaling circuit 430, and a summing circuit 440. The concatenating circuit 410 is coupled to the partition circuit 112 to receive an original ROI image XLR(t-1) corresponding to a previous time point and the original ROI image XLR(t) corresponding to a current time point. The concatenating circuit 410 may concatenate the original ROI images XLR(t-1) and XLR(t) in a channel dimension to generate a concatenated image CLR(t). The input end of the super-resolution circuit 420 is coupled to the concatenating circuit 410 to receive the concatenated image CLR(t). The super-resolution circuit 420 may perform the VSR reconstruction on the concatenated image CLR(t) to generate a high-resolution image YHR(t-1). By using the concept of residual learning, the super-resolution circuit 420 may output details of the image (high-resolution image YHR(t-1)).

The resolution upscaling circuit 430 is coupled to the partition circuit 112 to receive the original ROI image XLR(t). The resolution upscaling circuit 430 upscales the resolution of the original ROI image XLR(t) corresponding to the current time point to generate a high-resolution image XHR(t) corresponding to the current time point. For example, based on the actual design, the resolution upscaling circuit 430 may use bicubic up-sample algorithm, bicubic interpolation algorithm, or other resolution upscaling algorithms to upscale the resolution of the original ROI image XLR(t).

The summing circuit 440 is coupled to the output end of the super-resolution circuit 420 to receive the high-resolution image YHR(t-1). The summing circuit 440 is coupled to the resolution upscaling circuit 430 to receive the high-resolution image XHR(t). The summing circuit 440 adds up the high-resolution images YHR(t-1) and XHR(t) (by element-wise addition) to generate the high-definition ROI image GHR(t) for the stitching circuit 114. By using the concept of residual learning, the summing circuit 440 may add the high-resolution image YHR(t-1) (details of image) to the high-resolution image XHR(t) at the current time point to generate the high-definition ROI image GHR(t).

For example, taking the operation scenario shown in FIG. 3 as an example, the ROI includes a first sub-ROI and a second sub-ROI, the original ROI image XLR(t) includes an original sub-region image XLR1($t$) corresponding to the first sub-ROI and an original sub-region image XLR2($t$) corresponding to the second sub-ROI, and the high-definition ROI image GHR(t) may include the sub-ROI image GHR1($t$) corresponding to the first sub-ROI and the sub-ROI image GHR2($t$) corresponding to the second sub-ROI. A first ratio value $\lambda 1$ corresponding to the first sub-ROI is different from a second ratio value $\lambda 2$ corresponding to the second sub-ROI. Taking the operation scenario shown in FIG. 3 as an example, the first ratio value $\lambda 1$ may be greater than the second ratio value $\lambda 2$. For example (but not limited thereto), the first ratio value $\lambda 1$ may be 1, and the second ratio value $\lambda 2$ may be 0.8.

In response to an output of the super-resolution circuit 420 corresponding to the first sub-ROI, the summing circuit 440 multiplies the output of the super-resolution circuit 420 (high frequency details of the image) by the first ratio value $\lambda 1$ and then adds the high-resolution image XHR(t) to generate the high-definition ROI image GHR(t). That is, the summing circuit 440 may calculate GHR(t)=$\lambda 1$*YHR(t-1)+ XHR(t). In response to an output of the super-resolution circuit 420 corresponding to the second sub-ROI, the summing circuit 440 multiplies the output of the super-resolution circuit 420 (high frequency details of the image) by the second ratio value $\lambda 2$ and then adds the high-resolution image XHR(t) to generate the high-definition ROI image GHR(t). That is, the summing circuit 440 may calculate GHR(t)=$\lambda 2$*YHR(t-1)+XHR(t).

Figure 5A:
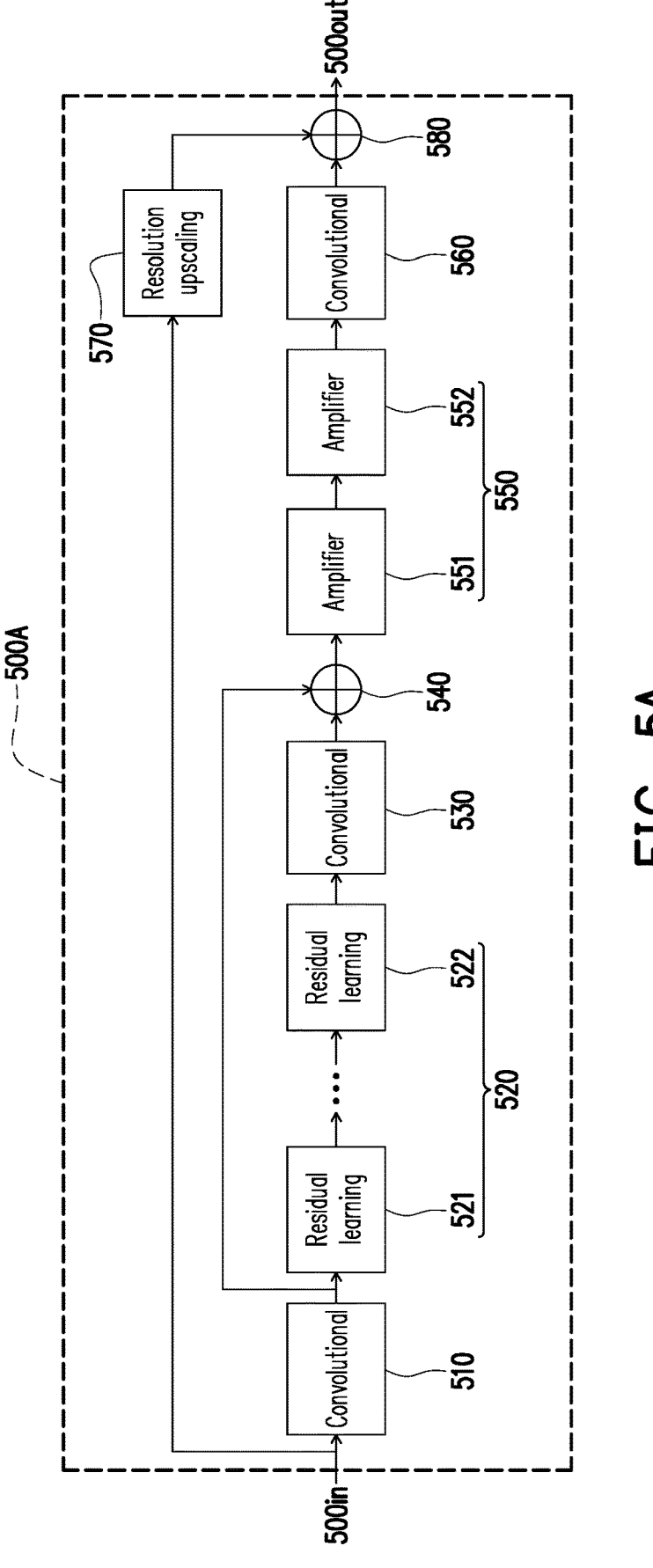
FIG. 5A is a circuit block schematic view of a super-resolution circuit according to an embodiment of the disclosure.

FIG. 5A is a circuit block schematic view of a super-resolution circuit 500A according to an embodiment of the disclosure. The super-resolution circuit 500A shown in FIG. 5A may be used as one of many implementation examples of the super-resolution circuit 420 shown in FIG. 4, or as one of many implementation examples of the super-resolution circuit 930 shown in FIG. 9, or as one of many implementation examples of the super-resolution circuit 1060 shown in FIG. 10, or as one of many implementation examples of the super-resolution circuit 1170 shown in FIG. 11A, or as one of many implementation examples of the super-resolution circuit 1170 shown in FIG. 11B. The super-resolution circuit 500A shown in FIG. 5A uses a simple but effective pixel attention network (PAN). In the embodiment shown in FIG. 5A, the super-resolution circuit 500A includes a convolutional circuit 510, a residual learning circuit string 520, a convolutional circuit 530, a summing circuit 540, an amplifier circuit string 550, a convolutional circuit 560, a resolution upscaling circuit 570, and a summing circuit 580.

The super-resolution circuit 500A shown in FIG. 5A is a pixel attention mechanism. This mechanism is mainly divided into three stages. First, features are extracted by a convolutional layer (convolutional circuit 510). After that, multiple SC-PA modules (residual learning circuit string 520) perform nonlinear mapping. Finally, multiple U-PA modules (amplifier circuit string 550) perform the final image reconstruction (upsampling). The pixel attention is mainly in the residual learning circuit string 520 and the amplifier circuit string 550.

The convolutional circuit 510 is coupled to an input end 500 in of the super-resolution circuit 500A to receive an input image. The residual learning circuit string 520 is coupled to an output end of the convolutional circuit 510 to receive a first convolution result image. The residual learning circuit string 520 performs a residual analysis on the first convolution result image to generate a residual result. The residual learning circuit string 520 includes multiple residual learning circuits, such as residual learning circuits 521 and 522 shown in FIG. 5A. The amount of residual learning circuit in the residual learning circuit string 520 may be determined according to the actual design. In some embodiments, each of the residual learning circuits in the residual learning circuit string 520 may include a SC-PA (self-calibrating convolution with pixel attention) circuit.

Figure 6:
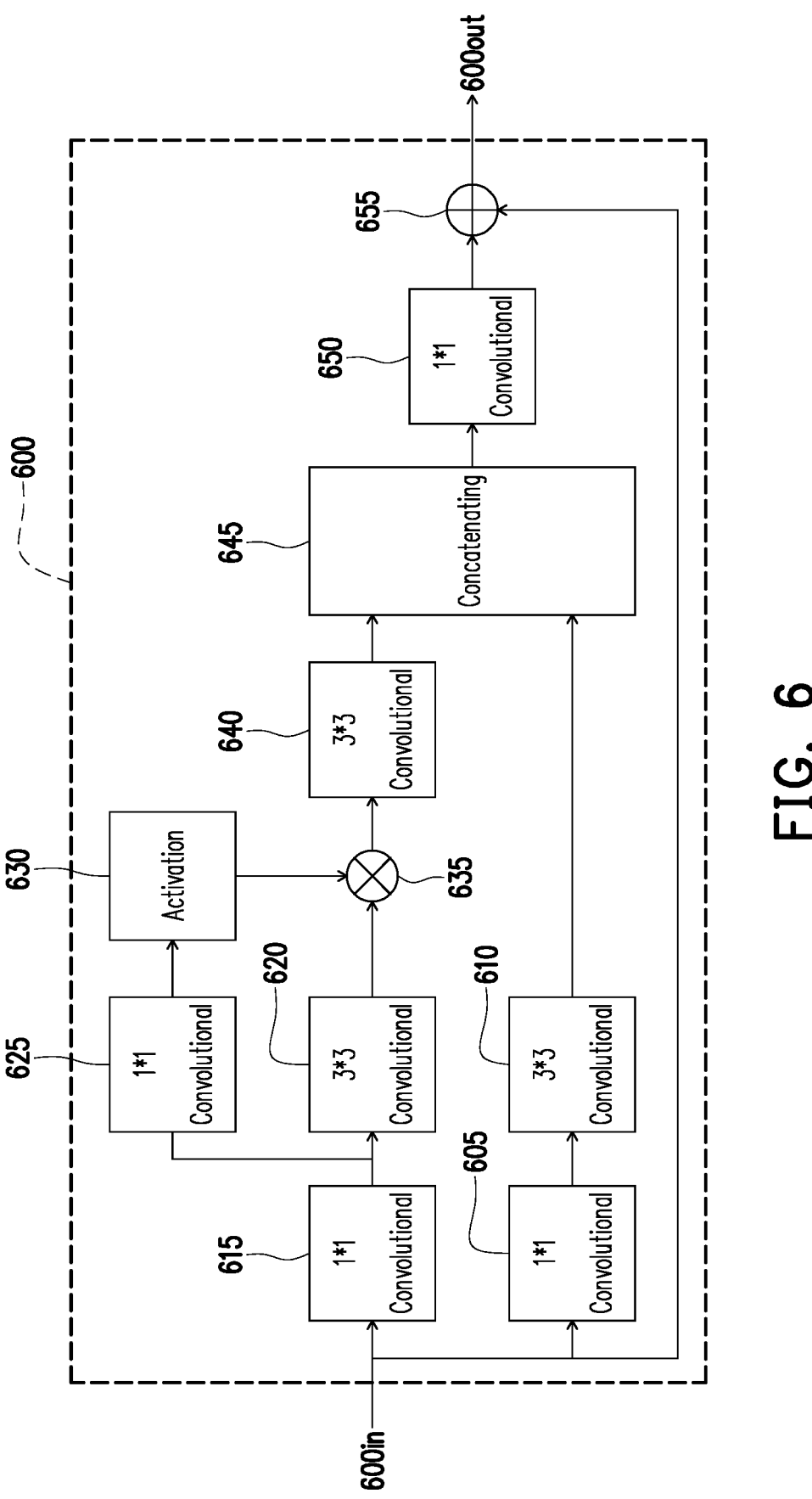
FIG. 6 is a circuit block schematic view of a residual learning circuit according to an embodiment of the disclosure.

FIG. 6 is a circuit block schematic view of a residual learning circuit 600 according to an embodiment of the disclosure. The residual learning circuit 600 shown in FIG. 6 may be used as one of many implementation examples of any residual learning circuit (e.g., residual learning circuit 521 or 522) in the residual learning circuit string 520 shown in FIG. 5A. In the embodiment shown in FIG. 6, the residual learning circuit 600 includes a convolutional circuit 605, a convolutional circuit 610, a convolutional circuit 615, a convolutional circuit 620, convolutional circuit 625, an activation circuit 630, a multiplication circuit 635, a convolutional circuit 640, a concatenating circuit 645, a convolutional circuit 650, and a summing circuit 655.

The convolutional circuit 605 is coupled to an input end 600 in of the residual learning circuit 600. The convolutional circuit 610 is coupled to an output end of the convolutional circuit 605. The convolutional circuit 615 is coupled to the input end 600 in of the residual learning circuit 600. The convolutional circuit 620 is coupled to an output end of the convolutional circuit 615. The convolutional circuit 625 is coupled to the output end of the convolutional circuit 615. The activation circuit 630 is coupled to an output end of the convolutional circuit 625. According to the actual design, the activation circuit 630 may perform sigmoid function calculation or other activation function calculations. The multiplication circuit 635 is coupled to an output end of the activation circuit 630 and an output end of the convolutional circuit 620. The convolutional circuit 640 is coupled to an output end of the multiplication circuit 635. The concatenating circuit 645 is coupled to an output end of the convolutional circuit 640 and an output end of the convolutional circuit 610. The convolutional circuit 650 is coupled to an output end of the concatenating circuit 645. The summing circuit 655 is coupled to an output end of the convolutional circuit 650. The summing circuit 655 is coupled to the input end 600 in of the residual learning circuit 600. An output end of the summing circuit 655 is coupled to an output end 600out of the residual learning circuit 600.

The residual learning circuit 600 shown in FIG. 6 introduces a pixel attention (PA) mechanism. The residual learning circuit 600 contains two branches, each of which contains a 1×1 convolution at the initial stage for feature dimensionality reduction, but the number of channels is cut in half. The upper branch further includes two 3×3 convolutions, one for the PA module. The lower branch only includes one 3×3 convolution to preserve original information. Finally, the output of the upper branch and the lower branch are aggregated through the concatenation and convolution mechanism. In order to speed up the training, the residual learning circuit 600 also introduces a residual connection.

Referring to FIG. 5A, the convolutional circuit 530 is coupled to an output end of the residual learning circuit string 520 to receive the residual result. The summing circuit 540 is coupled to the output end of the convolutional circuit 510 to receive a first convolution result image. The summing circuit 540 is coupled to an output end of the convolutional circuit 530 to receive a second convolution result image. The summing circuit 540 adds the second convolution result image to the first convolution result image to generate an addition result image. The amplifier circuit string 550 is coupled to an output end of the summing circuit 540 to receive the addition result image. The amplifier circuit string 550 performs a resolution upscaling on the addition result image to generate an enlarged image. The amplifier circuit string 550 includes multiple amplifier circuits, such as amplifier circuits 551 and 552 shown in FIG. 5A. The amount of amplifier circuit in the amplifier circuit string 550 may be determined according to the actual design. In some embodiments, each of the amplifier circuits in the amplifier circuit string 550 may include a U-PA (Upsampling-Pixel Attention) circuit.

Figure 7:
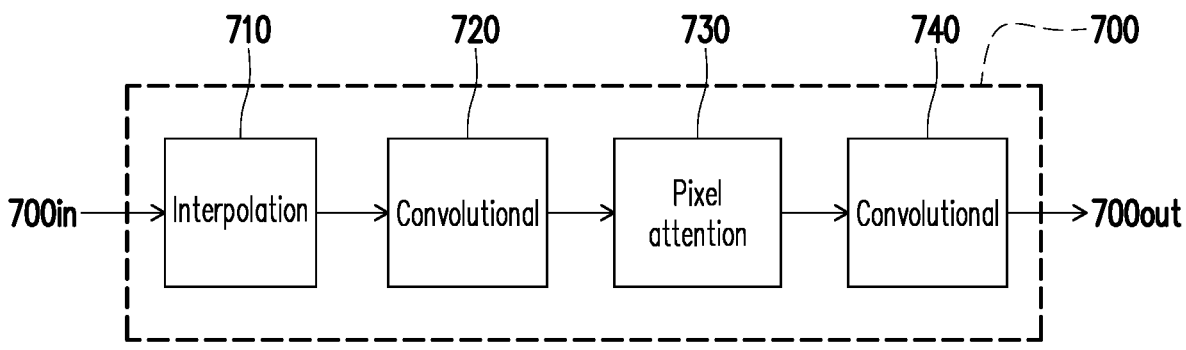
FIG. 7 is a circuit block schematic view of an amplifier circuit according to an embodiment of the disclosure.

FIG. 7 is a circuit block schematic view of an amplifier circuit 700 according to an embodiment of the disclosure. The amplifier circuit 700 shown in FIG. 7 may be used as one of many implementation examples of any amplifier circuit (e.g., amplifier circuit 551 or 552) in the amplifier circuit string 550 shown in FIG. 5A. In the embodiment shown in FIG. 7, the amplifier circuit 700 includes an interpolation circuit 710, a convolutional circuit 720, a pixel attention circuit 730, and a convolutional circuit 740. The interpolation circuit 710 is coupled to an input end 700 in of the amplifier circuit 700. The convolutional circuit 720 is coupled to an output end of the interpolation circuit 710. The pixel attention circuit 730 is coupled to an output end of the convolutional circuit 720. The convolutional circuit 740 is coupled to an output end of the pixel attention circuit 730. An output end of the convolutional circuit 740 is coupled to an output end 700out of the amplifier circuit 700. The pixel attention mechanism is also adopted in the amplifier circuit 700, and the interpolation circuit 710 may perform nearest-neighbor interpolation.

Figure 8:
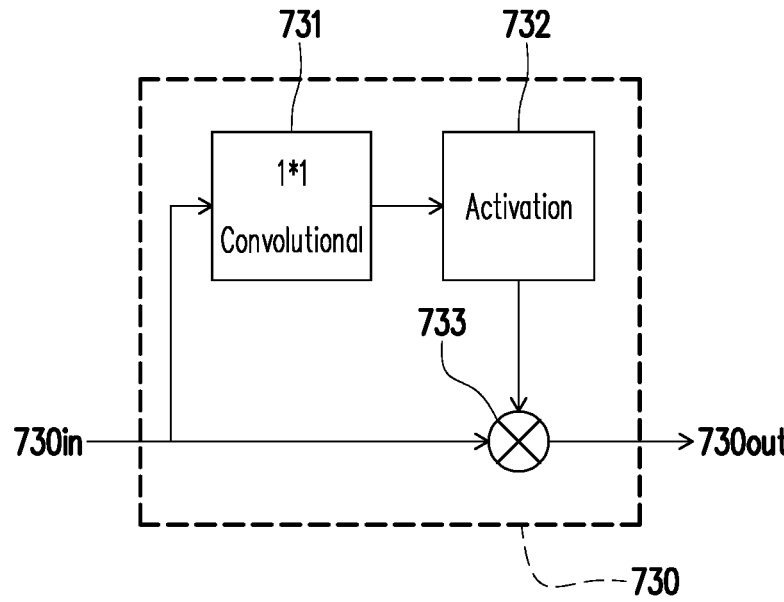
FIG. 8 is a circuit block schematic view of a pixel attention circuit according to an embodiment of the disclosure.

FIG. 8 is a circuit block schematic view of a pixel attention circuit 730 according to an embodiment of the disclosure. The pixel attention circuit 730 shown in FIG. 8 may be used as one of many implementation examples of the pixel attention circuit 730 shown in FIG. 7. In the embodiment shown in FIG. 8, the pixel attention circuit 730 includes a convolutional circuit 731, an activation circuit 732, and a multiplication circuit 733. The convolutional circuit 731 is coupled to an input end 730 in of the pixel attention circuit 730. The activation circuit 732 is coupled to an output end of the convolutional circuit 731. According to the actual design, the activation circuit 732 may perform sigmoid function calculation or other activation function calculations. The multiplication circuit 733 is coupled to an output end of the activation circuit 732 and the input end 730 in of the pixel attention circuit 730. An output end of the multiplication circuit 733 is coupled to an output end 730out of the pixel attention circuit 730.

Referring to FIG. 5A, the convolutional circuit 560 is coupled to an output end of the amplifier circuit string 550 to receive an enlarged image. The resolution upscaling circuit 570 is coupled to the input end 500 in of the super-resolution circuit 500A to receive an input image. The resolution upscaling circuit 570 upscales the resolution of the input image to generate a resolution upscaled image. For example, the resolution upscaling circuit 570 may perform linear interpolation, bilinear interpolation, or other interpolation calculations to upscale the resolution of the input image. The summing circuit 580 is coupled to an output end of the resolution upscaling circuit 570 to receive the resolution upscaled image. The summing circuit 580 is coupled to the output end of the convolutional circuit 560 to receive a third convolution result image. The summing circuit 580 adds the third convolution result image to the resolution upscaled image to generate a high-resolution image to an output end 500out of the super-resolution circuit 500A.

Figure 5B:
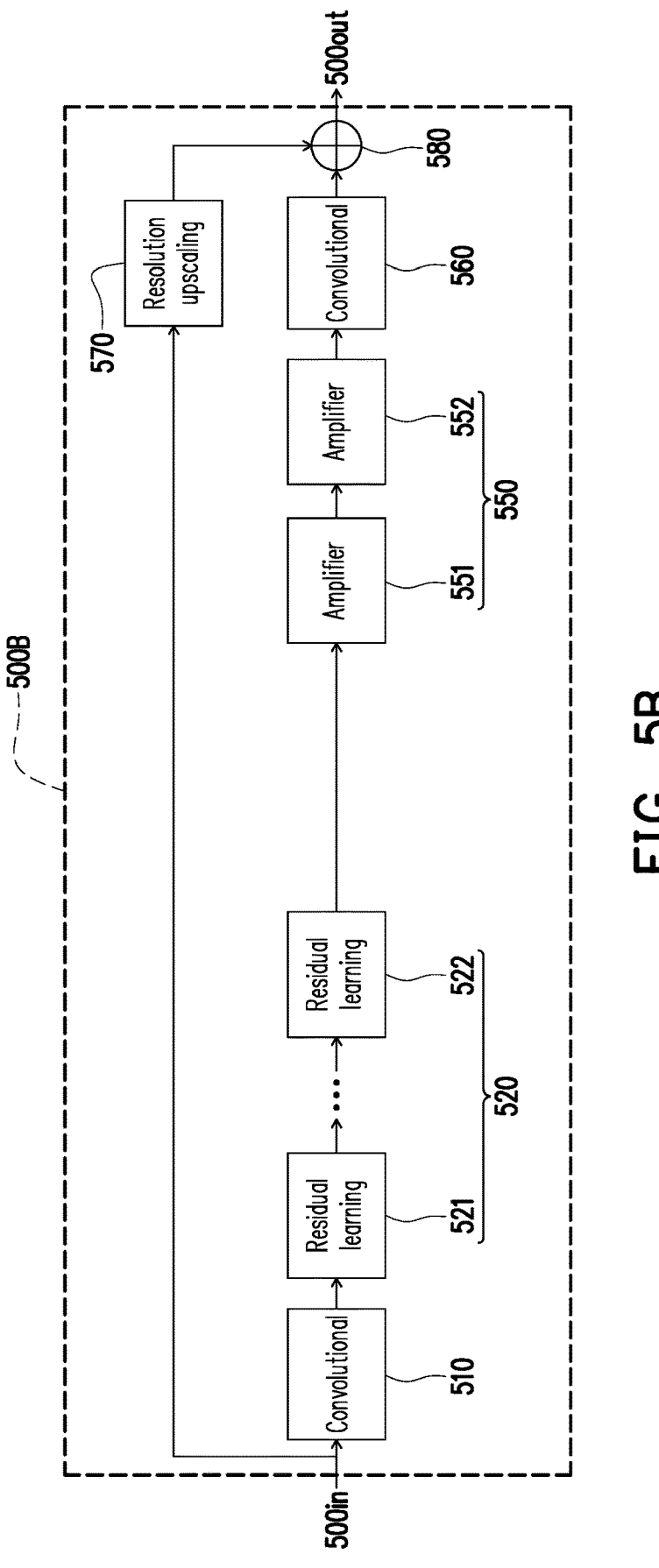
FIG. 5B is a circuit block schematic view of a super-resolution circuit according to another embodiment of the disclosure.

FIG. 5B is a circuit block schematic view of a super-resolution circuit 500B according to another embodiment of the disclosure. The super-resolution circuit 500B shown in FIG. 5B may be used as one of many implementation examples of the super-resolution circuit 420 shown in FIG. 4, or as one of many implementation examples of the super-resolution circuit 930 shown in FIG. 9, or as one of many implementation examples of the super-resolution circuit 1060 shown in FIG. 10, or as one of many implementation examples of the super-resolution circuit 1170 shown in FIG. 11A, or as one of many implementation examples of the super-resolution circuit 1170 shown in FIG. 11B. The super-resolution circuit 500B shown in FIG. 5B uses a simple but effective pixel attention network (PAN).

In the embodiment shown in FIG. 5B, the super-resolution circuit 500B includes a convolutional circuit 510, a residual learning circuit string 520, an amplifier circuit string 550, a convolutional circuit 560, a resolution upscaling circuit 570, and a summing circuit 580. The convolutional circuit 510, the residual learning circuit string 520, the amplifier circuit string 550, the convolutional circuit 560, the resolution upscaling circuit 570, and the summing circuit 580 shown in FIG. 5B may refer to the relevant description of the convolutional circuit 510, the residual learning circuit string 520, the amplifier circuit string 550, the convolutional circuit 560, the resolution upscaling circuit 570, and the summing circuit 580 shown in FIG. 5A by analogy, so details are not repeated herein. What is different from the super-resolution circuit 500A shown in FIG. 5A is that the super-resolution circuit 500B shown in FIG. 5B omits the convolutional circuit 530 and the summing circuit 540. In the embodiment shown in FIG. 5B, the input end of the amplifier circuit string 550 is coupled to the output end of the residual learning circuit string 520 to receive the residual result. The amplifier circuit string 550 performs a resolution upscaling on the residual result to generate an enlarged image.

Figure 9:
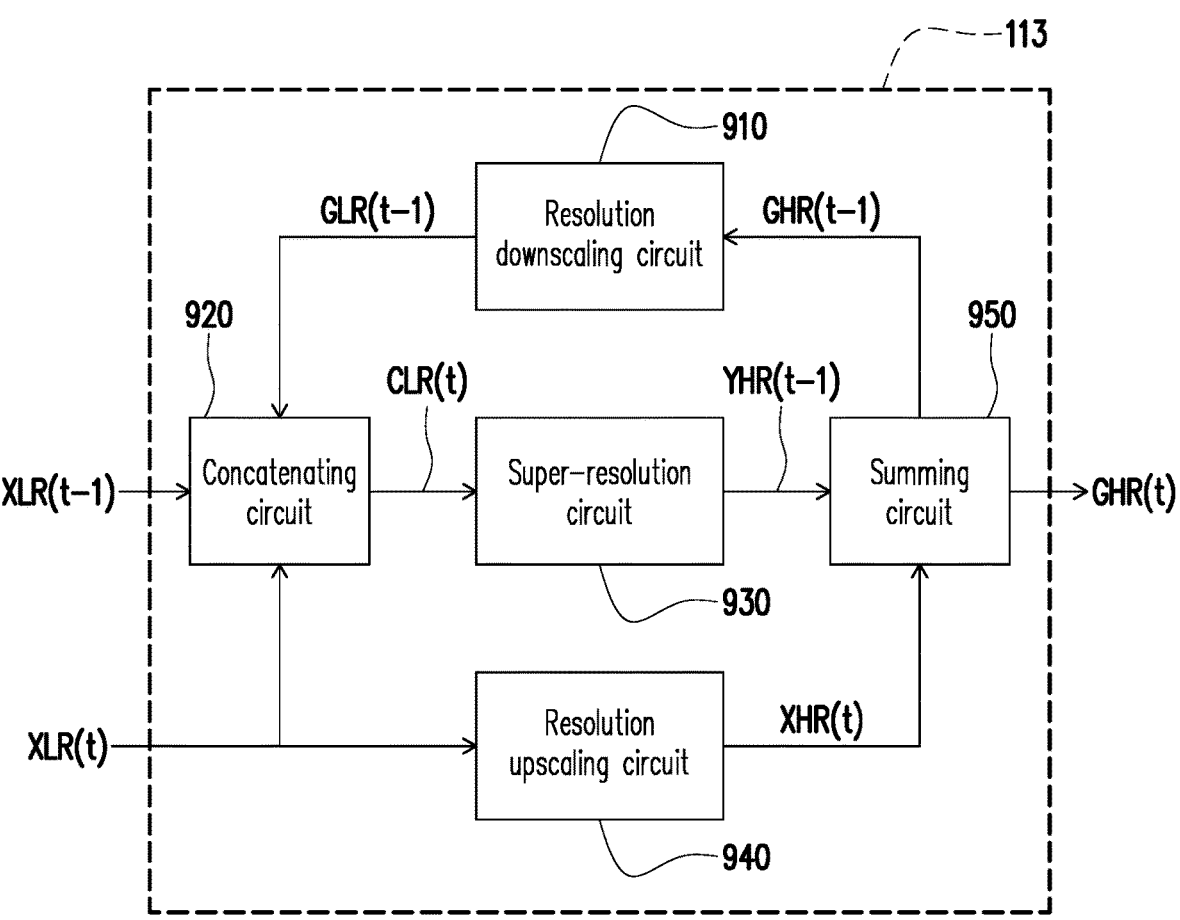
FIG. 9 is a circuit block schematic view of a VSR reconstruction circuit according to another embodiment of the disclosure.

FIG. 9 is a circuit block schematic view of a VSR reconstruction circuit 113 according to another embodiment of the disclosure. The VSR reconstruction circuit 113 shown in FIG. 9 may be used as one of many implementation examples of the VSR reconstruction circuit 113 shown in FIG. 1. In the embodiment shown in FIG. 9, the VSR reconstruction circuit 113 includes a resolution downscaling circuit 910, a concatenating circuit 920, a super-resolution circuit 930, a resolution upscaling circuit 940, and a summing circuit 950. The resolution downscaling circuit 910 may downscale the resolution of the high-definition ROI image GHR(t-1) corresponding to a previous time point to generate a low-resolution image GLR(t-1).

The concatenating circuit 920 is coupled to the partition circuit 112 to receive an original ROI image XLR(t-1) corresponding to a previous time point and the original ROI image XLR(t) corresponding to a current time point. The concatenating circuit 920 is coupled to the resolution downscaling circuit 910 to receive the low-resolution image GLR(t-1). The concatenating circuit 920 may concatenate the low-resolution image GLR(t-1) corresponding to the previous time point, the original ROI image XLR(t-1) corresponding to the previous time point, and the original ROI image XLR(t-1) corresponding to the current time point to generate a concatenated image CLR(t). The super-resolution circuit 930 is coupled to the concatenating circuit 920 to receive the concatenated image CLR(t). The super-resolution circuit 930 may perform the VSR reconstruction on the concatenated image CLR(t) to generate image details (high-resolution image YHR(t-1)). The concatenating circuit 920 shown in FIG. 9 may refer to the relevant description of the concatenating circuit 410 shown in FIG. 4 by analogy. The super-resolution circuit 930 shown in FIG. 9 may refer to the relevant description of the super-resolution circuit 420 shown in FIG. 4 or the super-resolution circuit 500A shown in FIG. 5A or the super-resolution circuit 500B shown in FIG. 5B by analogy, so details are not repeated herein.

The resolution upscaling circuit 940 is coupled to the partition circuit 112 to receive the original ROI image XLR(t). The resolution upscaling circuit 940 upscales the resolution of the original ROI image XLR(t) corresponding to the current time point to generate a high-resolution image XHR(t) corresponding to the current time point. The resolution upscaling circuit 940 shown in FIG. 9 may refer to the relevant description of the resolution upscaling circuit 430 shown in FIG. 4 by analogy, so details are not repeated herein. The summing circuit 950 is coupled to the super-resolution circuit 930 to receive the high-resolution image YHR(t-1). The summing circuit 950 is coupled to the resolution upscaling circuit 940 to receive the high-resolution image XHR(t). The summing circuit 950 adds up the high-resolution images YHR(t-1) and XHR(t) (by element-wise addition) to generate a high-definition ROI image GHR(t) corresponding to the current time point for the stitching circuit 114. The summing circuit 950 provides the high-definition ROI image GHR(t-1) corresponding to the previous time point to the resolution downscaling circuit 910. By using the concept of residual learning, summing circuit 440 may add image details (high-resolution image YHR(t-1)) to the high-resolution image XHR(t) at the current time point to generate the high-definition ROI image GHR(t). The resolution upscaling circuit 940 and the summing circuit 950 shown in FIG. 9 may refer to the relevant descriptions of the resolution upscaling circuit 430 and the summing circuit 950 shown in FIG. 4 by analogy, so details are not repeated herein.

Figure 10:
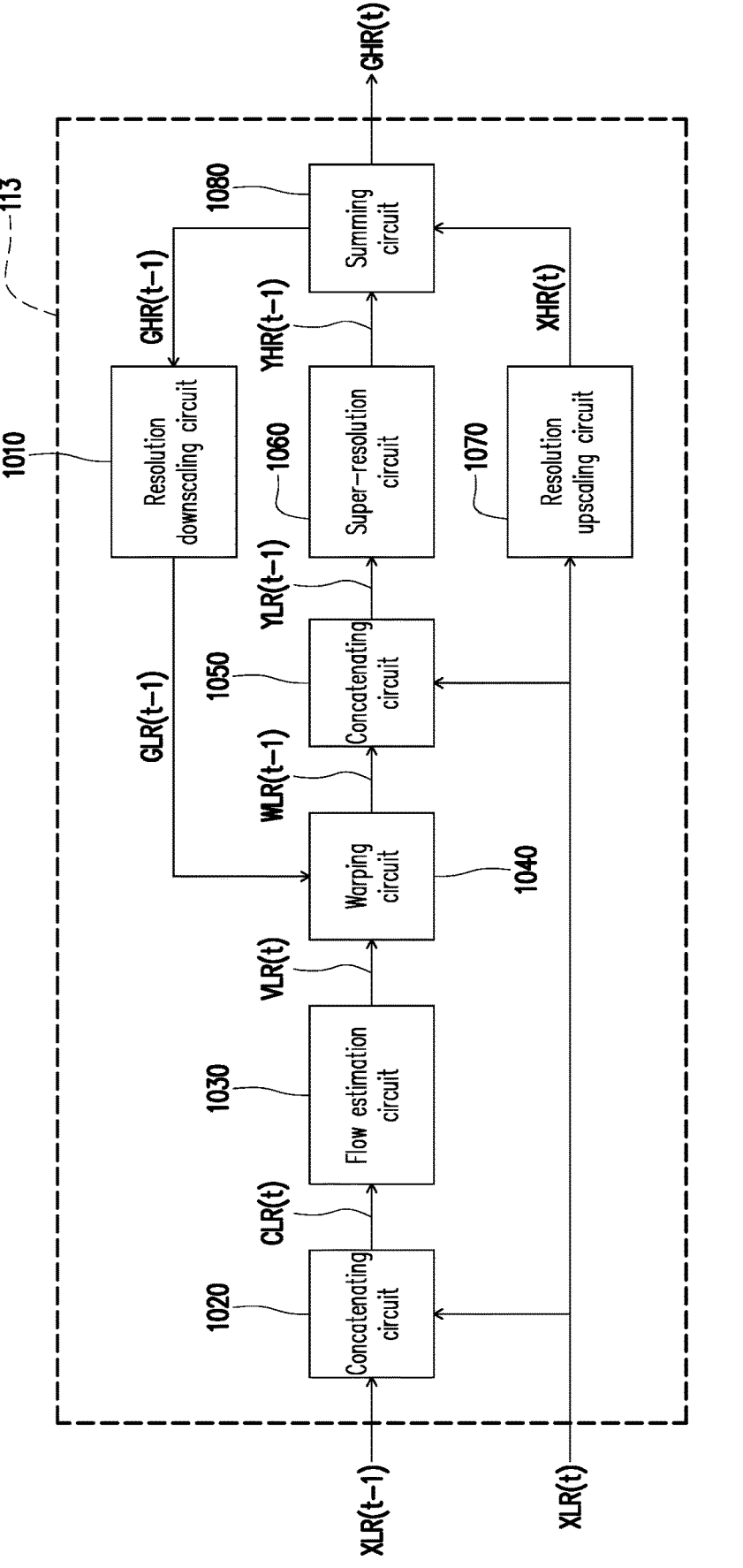
FIG. 10 is a circuit block schematic view of a VSR reconstruction circuit according to yet another embodiment of the disclosure.

FIG. 10 is a circuit block schematic view of a VSR reconstruction circuit 113 according to yet another embodiment of the disclosure. The VSR reconstruction circuit 113 shown in FIG. 10 may be used as one of many implementation examples of the VSR reconstruction circuit 113 shown in FIG. 1. In the embodiment shown in FIG. 10, the VSR reconstruction circuit 113 includes a resolution downscaling circuit 1010, a concatenating circuit 1020, a flow estimation circuit 1030, a warping circuit 1040, a concatenating circuit 1050, a super-resolution circuit 1060, a resolution upscaling circuit 1070, and a summing circuit 1080. The resolution downscaling circuit 1010 may downscale the resolution of the high-definition ROI image GHR(t-1) corresponding to a previous time point to generate a low-resolution image GLR(t-1). The resolution downscaling circuit 1010 shown in FIG. 10 may refer to the relevant description of the resolution downscaling circuit 910 shown in FIG. 9 by analogy, so details are not repeated herein.

The concatenating circuit 1020 is coupled to the partition circuit 112 to receive an original ROI image XLR(t-1) corresponding to a previous time point and the original ROI image XLR(t) corresponding to a current time point. The concatenating circuit 1020 may concatenate the original ROI image XLR(t-1) corresponding to the previous time point and the original ROI image XLR(t) corresponding to the current time point in the channel dimension to generate a concatenated image CLR (t). The concatenating circuit 1020 shown in FIG. 10 may refer to the relevant description of the concatenating circuit 410 shown in FIG. 4 by analogy, so details are not repeated herein.

The flow estimation circuit 1030 is coupled to the concatenating circuit 1020 to receive the concatenated image CLR(t). The flow estimation circuit 1030 may perform a flow prediction on the concatenated image CLR(t) to generate a low-resolution image VLR(t). Based on the actual design, the flow estimation circuit 1030 may perform the traditional flow estimation algorithm or other flow prediction/estimation algorithms to predict the optical flow result (low-resolution image VLR(t)). Generally, the so-called optical flow may be regarded as the exercise vector between two pictures. There are many traditional flow estimation algorithms, such as the Farneback flow estimation algorithm "cv2.calcOpticalFlowFarneback" in CV2. Farneback flow estimation algorithm is a traditional dense optical flow algorithm. Traditional flow algorithm does not use neural network, but uses mathematical algorithm to calculate the exercise vector between pixels, so as to reduce the parameter amount.

The warping circuit 1040 is coupled to the flow estimation circuit 1030 to receive the low-resolution image VLR(t). The warping circuit 1040 is coupled to the resolution downscaling circuit 1010 to receive the low-resolution image GLR(t-1). The warping circuit 1040 warps the low-resolution image VLR(t) to the low-resolution image GLR (t-1) to generate a warped image WLR(t-1) corresponding to the previous time point. For example, the warping circuit 1040 may adopt algorithms such as backward warping or inverse warping. For a coordinate (x,y) on the warped image, the warping circuit 1040 may use a reverse mapping function to find a corresponding position (u,v) on the original image. If necessary (e.g., the calculated position (u,v) is not on the grid), the warping circuit 1040 may also obtain pixel values by using the interpolation method. The purpose of warping is to allow the convolutional layer, an operation that sense vision locally (the operation of the super-resolution circuit 1060), to simultaneously capture the same features of WLR(t-1) and XLR(t) with different timing features By using the concept of "the super-resolution image of the previous time is a recurrent neural network (RNN)", the super-resolution result (low-resolution image GLR(t-1)) corresponding to the previous time point is input as a current picture, so that the temporal consistency of the output super-resolution result (high-definition ROI image GHR(t)) is maintained and image flickers are avoided.

The concatenating circuit 1050 is coupled to the warping circuit 1040 to receive the warped image WLR(t-1). The concatenating circuit 1050 is coupled to the partition circuit 112 to receive the original ROI image XLR(t) corresponding to the current time point. The concatenating circuit 1050 may concatenate the warped image WLR(t-1) corresponding to the previous time point and the original ROI image XLR(t) corresponding to the current time point to generate a concatenated image YLR(t-1). The super-resolution circuit 1060 is coupled to the concatenating circuit 1050 to receive the concatenated image YLR(t-1). The super-resolution circuit 1060 may perform the VSR reconstruction on the concatenated image YLR(t-1) to generate image details (high-resolution image YHR(t-1)). The super-resolution circuit 1060 shown in FIG. 10 may refer to the relevant descriptions of the super-resolution circuit 420 shown in FIG. 4 or the super-resolution circuit 500A shown in FIG. 5A or the super-resolution circuit 500B shown in FIG. 5B by analogy, so details are not repeated herein.

The resolution upscaling circuit 1070 is coupled to the partition circuit 112 to receive the original ROI image XLR(t). The resolution upscaling circuit 1070 may upscale the resolution of the original ROI image XLR(t) corresponding to the current time point to generate a high-resolution image XHR(t) corresponding to the current time point. The resolution upscaling circuit 1070 shown in FIG. 10 may refer to the relevant description of the resolution upscaling circuit 430 shown in FIG. 4 by analogy, so details are not repeated herein. The summing circuit 1080 is coupled to the super-resolution circuit 1060 to receive the high-resolution image YHR(t-1). The summing circuit 1080 is coupled to the resolution upscaling circuit 1070 to receive the high-resolution image XHR(t). The summing circuit 1080 may add up the high-resolution images YHR(t-1) and XHR(t) (by element-wise addition) to generate a high-definition ROI image GHR(t) corresponding to the current time point for the stitching circuit 114. The summing circuit 1080 provides the high-definition ROI image GHR(t-1) corresponding to the previous time point to the resolution downscaling circuit 1010. The summing circuit 1080 shown in FIG. 10 may refer to the relevant description of the summing circuit 950 shown in FIG. 9 by analogy, so details are not repeated herein.

Figure 11A:
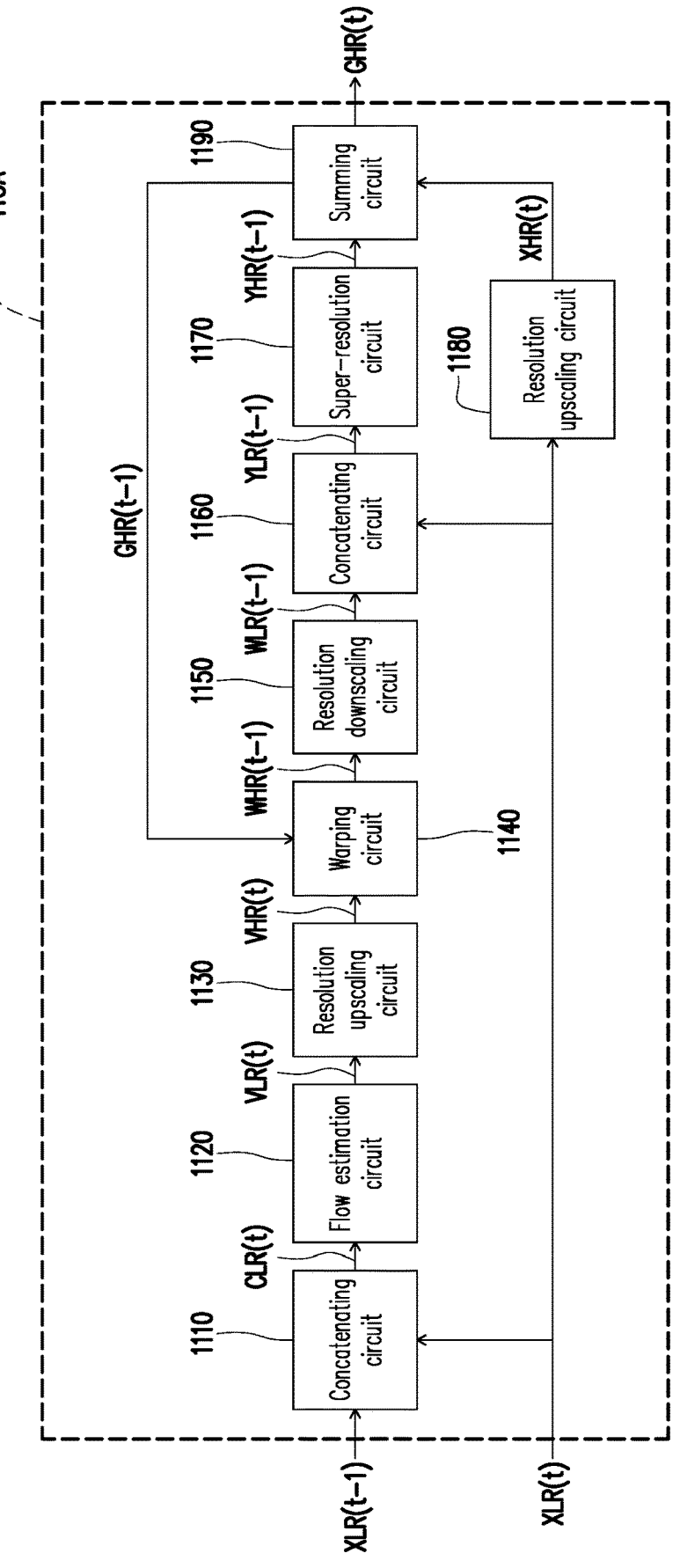
FIG. 11A is a circuit block schematic view of the VSR reconstruction circuit according to another embodiment of the disclosure.

FIG. 11A is a circuit block schematic view of the VSR reconstruction circuit 113A according to another embodiment of the disclosure. The VSR reconstruction circuit 113A shown in FIG. 11A may be used as one of many implementation examples of the VSR reconstruction circuit 113 shown in FIG. 1. In the embodiment shown in FIG. 11A, the VSR reconstruction circuit 113A includes a concatenating circuit 1110, a flow estimation circuit 1120, a resolution upscaling circuit 1130, a warping circuit 1140, a resolution downscaling circuit 1150, a concatenating circuit 1160, a super-resolution circuit 1170, a resolution upscaling circuit 1180, and a summing circuit 1190. The concatenating circuit 1110 is coupled to the partition circuit 112 to receive an original ROI image XLR(t-1) corresponding to a previous time point and the original ROI image XLR(t) corresponding to a current time point. The concatenating circuit 1110 may concatenate the original ROI image XLR(t-1) corresponding to the previous time point and the original ROI image XLR(t) corresponding to the current time point in the channel dimension to generate a concatenated image CLR(t). The concatenating circuit 1110 shown in FIG. 11A may refer to the relevant description of the concatenating circuit 410 shown in FIG. 4 by analogy, so details are not repeated herein.

The flow estimation circuit 1120 is coupled to the concatenating circuit 1110 to receive the concatenated image CLR(t). The flow estimation circuit 1120 may perform a flow prediction on the concatenated image CLR(t) to generate a low-resolution image VLR(t). The flow estimation circuit 1120 shown in FIG. 11A may refer to the relevant description of the flow estimation circuit 1030 shown in FIG. 10 by analogy, so details are not repeated herein. The resolution upscaling circuit 1130 is coupled to the flow estimation circuit 1120 to receive the low-resolution image VLR(t). The resolution upscaling circuit 1130 may upscale the resolution of the low-resolution image VLR(t) to generate a high-resolution image VHR(t). For example, the resolution upscaling circuit 1130 may perform linear interpolation, bilinear interpolation, or other interpolation calculations to upscale the resolution of the low-resolution image VLR(t). The resolution upscaling circuit 1130 may amplify the optical flow (low-resolution image VLR(t)) into the high-resolution image VHR(t) through interpolation, so that the optical flow and the super-resolution image (high-definition ROI image GHR(t-1)) at the previous time point have the same space size, which is convenient for the warping circuit 1140 to perform the warping operation.

The warping circuit 1140 is coupled to the resolution upscaling circuit 1130 to receive the high-resolution image VHR(t). The warping circuit 1140 warps the high-resolution image VHR(t) to the high-definition ROI image GHR(t-1) corresponding to the previous time point to generate a warped image WHR(t-1) corresponding to the previous time point. The warping circuit 1140 shown in FIG. 11A may refer to the relevant description of the warping circuit 1040 shown in FIG. 10 by analogy, so details are not repeated herein. The resolution downscaling circuit 1150 is coupled to the warping circuit 1140 to receive the warped image WHR(t-1). The resolution downscaling circuit 1150 may downscale the resolution of the warped image WHR(t-1) to generate a low-resolution image (warped image WLR(t-1)). For example, the resolution downscaling circuit 1150 may perform a space-to-depth operation to downsize the warped image WHR(t-1) to the warped image WLR(t-1). The space-to-depth operation reduces the space size by rearranging the channels to r^2 times the amount without losing image information.

The concatenating circuit 1160 is coupled to the resolution downscaling circuit 1150 to receive the low-resolution image (warped image WLR(t-1)). The concatenating circuit 1160 is coupled to the partition circuit 112 to receive the original ROI image XLR(t) corresponding to the current time point. The concatenating circuit 1160 concatenates the low-resolution image (warped image WLR(t-1)) corresponding to the previous time point and the original ROI image XLR(t) corresponding to the current time point to generate a concatenated image YLR(t-1). The concatenating circuit 1160 shown in FIG. 11A may refer to the relevant description of the concatenating circuit 1050 shown in FIG. 10 by analogy, so details are not repeated herein. The super-resolution circuit 1170 is coupled to the concatenating circuit 1160 to receive the concatenated image YLR(t-1).

The super-resolution circuit 1170 may perform the VSR reconstruction on the concatenated image YLR(t-1) to generate image details (high-resolution image YHR(t-1)). The super-resolution circuit 1170 shown in FIG. 11A may refer to the relevant descriptions of the super-resolution circuit 420 shown in FIG. 4 or the super-resolution circuit 500A shown in FIG. 5A or the super-resolution circuit 500B shown in FIG. 5B by analogy, so details are not repeated herein.

The resolution upscaling circuit 1180 is coupled to the partition circuit 112 to receive the original ROI image XLR(t). The resolution upscaling circuit 1180 may upscale the resolution of the original ROI image XLR(t) corresponding to the current time point to generate a high-resolution image XHR(t). The resolution upscaling circuit 1180 shown in FIG. 11A may refer to the relevant description of the resolution upscaling circuit 430 shown in FIG. 4 by analogy, so details are not repeated herein. The summing circuit 1190 is coupled to the super-resolution circuit 1170 to receive the high-resolution image YHR(t-1). The summing circuit 1190 is coupled to the resolution upscaling circuit 1180 to receive the high-resolution image XHR(t). The summing circuit 1190 may add up the high-resolution images YHR(t-1) and XHR(t) (by element-wise addition) to generate a high-definition ROI image GHR(t) corresponding to the current time point for the stitching circuit 114. The summing circuit 1190 provides the high-definition ROI image GHR(t-1) corresponding to the previous time point to the warping circuit 1140. The summing circuit 1190 shown in FIG. 11A may refer to the relevant description of the summing circuit 950 shown in FIG. 9 by analogy, so details are not repeated herein.

Figure 11B:
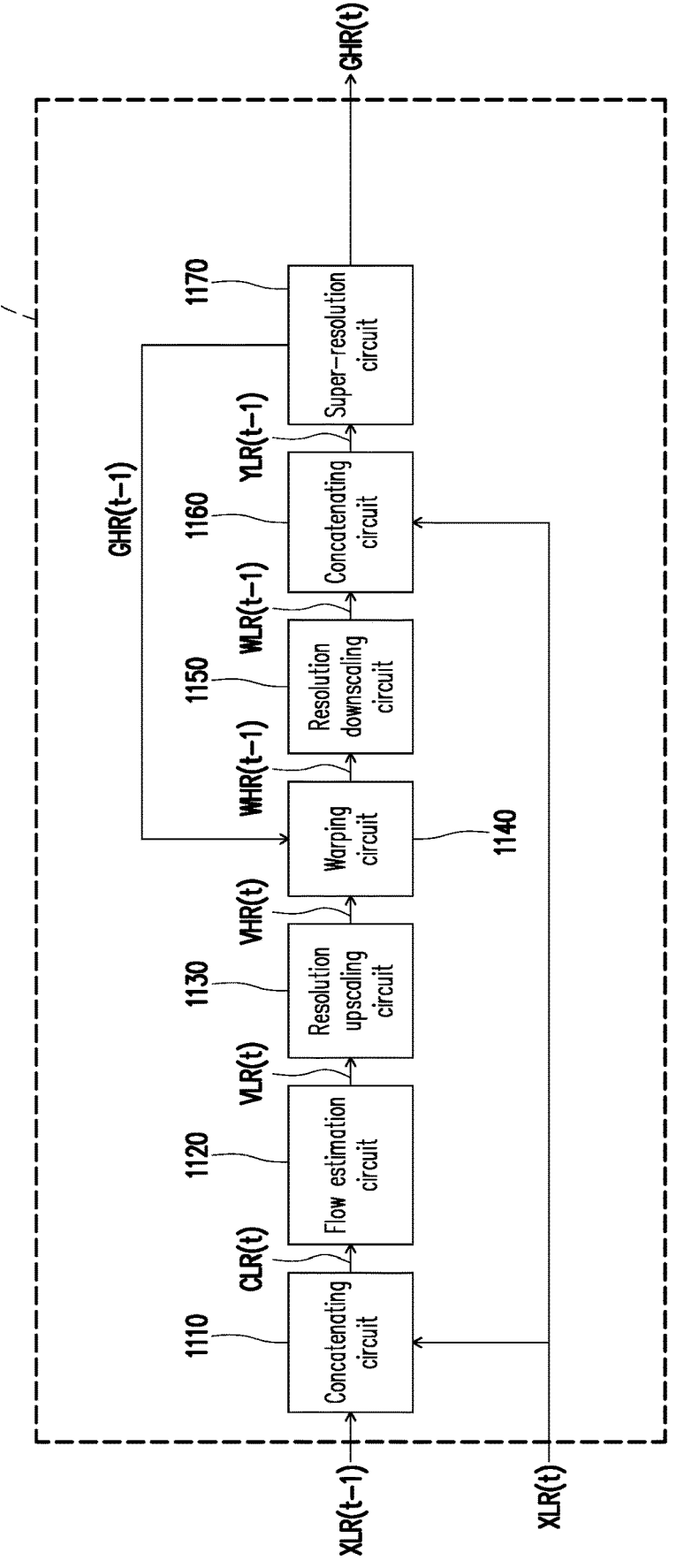
FIG. 11B is a circuit block schematic view of the VSR reconstruction circuit according to another embodiment of the disclosure.

FIG. 11B is a circuit block schematic view of the VSR reconstruction circuit 113B according to another embodiment of the disclosure. The VSR reconstruction circuit 113B shown in FIG. 11B may be used as one of many implementation examples of the VSR reconstruction circuit 113 shown in FIG. 1. In the embodiment shown in FIG. 11B, the VSR reconstruction circuit 113B includes a concatenating circuit 1110, a flow estimation circuit 1120, a resolution upscaling circuit 1130, a warping circuit 1140, a resolution downscaling circuit 1150, a concatenating circuit 1160, and a super-resolution circuit 1170. The concatenating circuit 1110, the flow estimation circuit 1120, the resolution upscaling circuit 1130, the warping circuit 1140, the resolution downscaling circuit 1150, the concatenating circuit 1160, and the super-resolution circuit 1170 shown in FIG. 11B may refer to the relevant description of the concatenating circuit 1110, the flow estimation circuit 1120, the resolution upscaling circuit 1130, the warping circuit 1140, the resolution downscaling circuit 1150, the concatenating circuit 1160, and the super-resolution circuit 1170 shown in FIG. 11A by analogy, so details are not repeated herein. What is different from the VSR reconstruction circuit 113A shown in FIG. 11A is that the VSR reconstruction circuit 113B shown in FIG. 11B omits the resolution upscaling circuit 1180 and the summing circuit 1190. In the embodiment shown in FIG. 11B, the super-resolution circuit 1170 may generate a high-definition ROI image GHR(t) corresponding to the current time point for the stitching circuit 114. The super-resolution circuit 1170 provides the high-definition ROI image GHR(t-1) corresponding to the previous time point to the warping circuit 1140.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A display apparatus, comprising:
a display panel; and
an image processing device, coupled to the display panel, wherein the image processing device receives a low-resolution image from a host, the image processing device tracks a user's gaze to define a region of interest, the image processing device partitions the low-resolution image into an original ROI image corresponding to the region of interest and other region image apart from the original ROI image, the image processing device performs a video super-resolution reconstruction on the original ROI image of the low-resolution image to generate a high-definition ROI image, the image processing device stitches the high-definition ROI image and the other region image of the low-resolution image to generate a processed image, and the image processing device controls the display panel to display the processed image,
wherein the region of interest comprises a plurality of sub-regions of interest, the high-definition ROI image comprises a plurality of sub-ROI images, the image processing device defines the plurality of sub-regions of interest based on a tracking result of the user's gaze, the image processing device performs the video super-resolution reconstruction on each of the sub-regions of interest in the low-resolution image to generate the plurality of sub-ROI images with different sharpness, and the image processing device pastes the plurality of sub-ROI images back to the sub-regions of interest in the low-resolution image to present a multi-layer progressive sharpness effect between the region of interest and another region in the processed image.

2. The display apparatus according to claim 1, wherein the image processing device comprises:
an eye tracking circuit, configured to track the user's gaze;
a partition circuit, coupled to the eye tracking circuit, wherein the partition circuit receives the low-resolution image from the host, the partition circuit defines the region of interest based on a tracking result of the eye tracking circuit, and the partition circuit partitions the low-resolution image into the original ROI image corresponding to the region of interest and the other region image apart from the original ROI image;
a video super-resolution reconstruction circuit, coupled to the partition circuit to receive the original ROI image, wherein the video super-resolution reconstruction circuit performs the video super-resolution reconstruction on the original ROI image of the low-resolution image to generate the high-definition ROI image; and
a stitching circuit, coupled to the partition circuit to receive the other region image and coupled to the video super-resolution reconstruction circuit to receive the high-definition ROI image, wherein the stitching circuit stitches the high-definition ROI image and the other region image of the low-resolution image to generate the processed image.

3. The display apparatus according to claim 2, wherein the original ROI image comprises a plurality of original sub-region images, the partition circuit defines the sub-regions of interest based on the tracking result of the eye tracking circuit, the video super-resolution reconstruction circuit performs the video super-resolution reconstruction on each of the original sub-region images corresponding to the sub-regions of interest to generate the sub-ROI images with different sharpness, and the stitching circuit pastes the sub-ROI images back to the sub-regions of interest in the low-resolution image to present a multi-layer progressive sharpness effect between the region of interest and another region in the processed image.

4. The display apparatus according to claim 2, wherein the video super-resolution reconstruction circuit comprises:

a first concatenating circuit, coupled to the partition circuit to receive the original ROI image, wherein the first concatenating circuit concatenates the original ROI image corresponding to a previous time point and the original ROI image corresponding to a current time point in a channel dimension to generate a concatenated image;

a super-resolution circuit, coupled to the first concatenating circuit to receive the concatenated image, wherein the super-resolution circuit performs the video super-resolution reconstruction on the concatenated image to generate a first high-resolution image;

a first resolution upscaling circuit, coupled to the partition circuit to receive the original ROI image, wherein the first resolution upscaling circuit upscales a resolution of the original ROI image corresponding to the current time point to generate a second high-resolution image; and a first summing circuit, coupled to the super-resolution circuit to receive the first high-resolution image and coupled to the first resolution upscaling circuit to receive the second high-resolution image, wherein the first summing circuit adds up the first high-resolution image and the second high-resolution image to generate the high-definition ROI image for the stitching circuit.

5. The display apparatus according to claim 4, wherein the region of interest comprises a first sub-region of interest and a second sub-region of interest, and a first ratio value corresponding to the first sub-region of interest is different from a second ratio value corresponding to the second sub-region of interest, in response to an output of the super-resolution circuit corresponding to the first sub-region of interest, the first summing circuit multiplies the output of the super-resolution circuit by the first ratio value and then adds the second high-resolution image to generate the high-definition ROI image; and in response to the output of the super-resolution circuit corresponding to the second sub-region of interest, the first summing circuit multiplies the output of the super-resolution circuit by the second ratio value and then adds the second high-resolution image to generate the high-definition ROI image.

6. The display apparatus according to claim 4, wherein the super-resolution circuit comprises:

a first convolutional circuit, coupled to an input end of the super-resolution circuit to receive an input image;

a residual learning circuit string, coupled to an output end of the first convolutional circuit to receive a first convolution result image, wherein the residual learning circuit string performs a residual analysis on the first convolution result image to generate a residual result;

a second convolutional circuit, coupled to an output end of the residual learning circuit string to receive the residual result;

a second summing circuit, coupled to the output end of the first convolutional circuit to receive the first convolution result image and coupled to an output end of the second convolutional circuit to receive a second convolution result image, wherein the second summing circuit adds the second convolution result image to the first convolution result image to generate an addition result image;

an amplifier circuit string, coupled to an output end of the second summing circuit to receive the addition result image, wherein the amplifier circuit string performs a resolution upscaling on the addition result image to generate an enlarged image;

a third convolutional circuit, coupled to an output end of the amplifier circuit string to receive the enlarged image;

a second resolution upscaling circuit, coupled to the input end of the super-resolution circuit to receive the input image, wherein the second resolution upscaling circuit upscales a resolution of the input image to generate a resolution upscaled image; and a third summing circuit, coupled to an output end of the second resolution upscaling circuit to receive the resolution upscaled image and coupled to an output end of the third convolutional circuit to receive a third convolution result image, wherein the third summing circuit adds the third convolution result image to the resolution upscaled image to generate a high-resolution image to an output end of the super-resolution circuit.

7. The display apparatus according to claim 6, wherein a residual learning circuit in the residual learning circuit string comprises:

a fourth convolutional circuit, coupled to an input end of the residual learning circuit;

a fifth convolutional circuit, coupled to an output end of the fourth convolutional circuit;

a sixth convolutional circuit, coupled to the input end of the residual learning circuit;

a seventh convolutional circuit, coupled to an output end of the sixth convolutional circuit;

an eighth convolutional circuit, coupled to the output end of the sixth convolutional circuit;

an activation circuit, coupled to an output end of the eighth convolutional circuit;

a multiplication circuit, coupled to an output end of the activation circuit and an output end of the seventh convolutional circuit;

a ninth convolutional circuit, coupled to an output end of the multiplication circuit;

a second concatenating circuit, coupled to an output end of the ninth convolutional circuit and an output end of the fifth convolutional circuit;

a tenth convolutional circuit, coupled to an output end of the second concatenating circuit; and a fourth summing circuit, coupled to an output end of the tenth convolutional circuit and coupled to the input end of the residual learning circuit, wherein an output end of the fourth summing circuit is coupled to an output end of the residual learning circuit.

8. The display apparatus according to claim 6, wherein an amplifier circuit in the amplifier circuit string comprises:

an interpolation circuit, coupled to an input end of the amplifier circuit;

a fourth convolutional circuit, coupled to an output end of the interpolation circuit;

a pixel attention circuit, coupled to an output end of the fourth convolutional circuit; and a fifth convolutional circuit, coupled to an output end of the pixel attention circuit, wherein an output end of the fifth convolutional circuit is coupled to an output end of the amplifier circuit.

9. The display apparatus according to claim 8, wherein the pixel attention circuit comprises:

a sixth convolutional circuit, coupled to an input end of the pixel attention circuit;

an activation circuit, coupled to an output end of the sixth convolutional circuit;

and a multiplication circuit, coupled to an output end of the activation circuit and the input end of the pixel attention circuit, wherein an output end of the multiplication circuit is coupled to an output end of the pixel attention circuit.

10. The display apparatus according to claim 4, wherein the super-resolution circuit comprises:

a first convolutional circuit, coupled to an input end of the super-resolution circuit to receive an input image;

a residual learning circuit string, coupled to an output end of the first convolutional circuit to receive a first convolution result image, wherein the residual learning circuit string performs a residual analysis on the first convolution result image to generate a residual result;

an amplifier circuit string, coupled to an output end of the residual learning circuit string to receive the residual result, wherein the amplifier circuit string performs a resolution upscaling on the residual result to generate an enlarged image;

a second convolutional circuit, coupled to an output end of the amplifier circuit string to receive the enlarged image;

a second resolution upscaling circuit, coupled to the input end of the super-resolution circuit to receive the input image, wherein the second resolution upscaling circuit upscales a resolution of the input image to generate a resolution upscaled image; and a third summing circuit, coupled to an output end of the second resolution upscaling circuit to receive the resolution upscaled image and coupled to an output end of the second convolutional circuit to receive a second convolution result image, wherein the third summing circuit adds the second convolution result image to the resolution upscaled image to generate a high-resolution image to an output end of the super-resolution circuit.

11. The display apparatus according to claim 2, wherein the video super-resolution reconstruction circuit comprises:

a resolution downscaling circuit, configured to downscale a resolution of the high-definition ROI image corresponding to a previous time point to generate a low-resolution image;

a concatenating circuit, coupled to the partition circuit to receive the original ROI image and coupled to the resolution downscaling circuit to receive the low-resolution image, wherein the concatenating circuit concatenates the low-resolution image corresponding to the previous time point, the original ROI image corresponding to the previous time point, and the original ROI image corresponding to a current time point to generate a concatenated image;

a super-resolution circuit, coupled to the concatenating circuit to receive the concatenated image, wherein the super-resolution circuit performs the video super-resolution reconstruction on the concatenated image to generate a first high-resolution image;

a resolution upscaling circuit, coupled to the partition circuit to receive the original ROI image, wherein the resolution upscaling circuit upscales a resolution of the original ROI image corresponding to the current time point to generate a second high-resolution image; and a summing circuit, coupled to the super-resolution circuit to receive the first high-resolution image and coupled to the resolution upscaling circuit to receive the second high-resolution image, wherein the summing circuit adds up the first high-resolution image and the second high-resolution image to generate the high-definition ROI image corresponding to the current time point for the stitching circuit, and the summing circuit provides the high-definition ROI image corresponding to the previous time point to the resolution downscaling circuit.

12. The display apparatus according to claim 2, wherein the video super-resolution reconstruction circuit comprises:

a resolution downscaling circuit, configured to downscale a resolution of the high-definition ROI image corresponding to a previous time point to generate a first low-resolution image;

a first concatenating circuit, coupled to the partition circuit to receive the original ROI image, wherein the first concatenating circuit concatenates the original ROI image corresponding to the previous time point and the original ROI image corresponding to a current time point in a channel dimension to generate a first concatenated image;

a flow estimation circuit, coupled to the first concatenating circuit to receive the first concatenated image, wherein the flow estimation circuit performs a flow prediction on the first concatenated image to generate a second low-resolution image;

a warping circuit, coupled to the flow estimation circuit to receive the second low-resolution image and coupled to the resolution downscaling circuit to receive the first low-resolution image, wherein the warping circuit warps the second low-resolution image to the first low-resolution image to generate a warped image corresponding to the previous time point;

a second concatenating circuit, coupled to the warping circuit to receive the warped image and coupled to the partition circuit to receive the original ROI image corresponding to the current time point, wherein the second concatenating circuit concatenates the warped image corresponding to the previous time point and the original ROI image corresponding to the current time point to generate a second concatenated image;

a super-resolution circuit, coupled to the second concatenating circuit to receive the second concatenated image, wherein the super-resolution circuit performs the video super-resolution reconstruction on the second concatenated image to generate a first high-resolution image;

a resolution upscaling circuit, coupled to the partition circuit to receive the original ROI image, wherein the resolution upscaling circuit upscales a resolution of the original ROI image corresponding to the current time point to generate a second high-resolution image; and a summing circuit, coupled to the super-resolution circuit to receive the first high-resolution image and coupled to the resolution upscaling circuit to receive the second high-resolution image, wherein the summing circuit adds up the first high-resolution image and the second high-resolution image to generate the high-definition ROI image corresponding to the current time point for the stitching circuit, and the summing circuit provides the high-definition ROI image corresponding to the previous time point to the resolution downscaling circuit.

13. The display apparatus according to claim 2, wherein the video super-resolution reconstruction circuit comprises:

a first concatenating circuit, coupled to the partition circuit to receive the original ROI image, wherein the first concatenating circuit concatenates the original ROI image corresponding to a previous time point and the original ROI image corresponding to a current time point in a channel dimension to generate a first concatenated image;

a flow estimation circuit, coupled to the first concatenating circuit to receive the first concatenated image, wherein the flow estimation circuit performs a flow prediction on the first concatenated image to generate a first low-resolution image;

a first resolution upscaling circuit, coupled to the flow estimation circuit to receive the first low-resolution image, wherein the first resolution upscaling circuit upscales a resolution of the first low-resolution image to generate a first high-resolution image; and a warping circuit, coupled to the first resolution upscaling circuit to receive the first high-resolution image, wherein the warping circuit warps the first high-resolution image to the high-definition ROI image corresponding to the previous time point to generate a warped image corresponding to the previous time point;

a resolution downscaling circuit, coupled to the warping circuit to receive the warped image and configured to downscale a resolution of the warped image to generate a second low-resolution image;

a second concatenating circuit, coupled to the resolution downscaling circuit to receive the second low-resolution image and coupled to the partition circuit to receive the original ROI image corresponding to the current time point, wherein the second concatenating circuit concatenates the second low-resolution image corresponding to the previous time point and the original ROI image corresponding to the current time point to generate a second concatenated image;

a super-resolution circuit, coupled to the second concatenating circuit to receive the second concatenated image, wherein the super-resolution circuit performs the video super-resolution reconstruction on the second concatenated image to generate a second high-resolution image;

a second resolution upscaling circuit, coupled to the partition circuit to receive the original ROI image, wherein the second resolution upscaling circuit upscales a resolution of the original ROI image corresponding to the current time point to generate a third high-resolution image; and a summing circuit, coupled to the super-resolution circuit to receive the second high-resolution image and coupled to the second resolution upscaling circuit to receive the third high-resolution image, wherein the summing circuit adds up the second high-resolution image and the third high-resolution image to generate the high-definition ROI image corresponding to the current time point for the stitching circuit, and the summing circuit provides the high-definition ROI image corresponding to the previous time point to the warping circuit.

14. The display apparatus according to claim 2, wherein the video super-resolution reconstruction circuit comprises:

a first concatenating circuit, coupled to the partition circuit to receive the original ROI image, wherein the first concatenating circuit concatenates the original ROI image corresponding to a previous time point and the original ROI image corresponding to a current time point in a channel dimension to generate a first concatenated image;

a flow estimation circuit, coupled to the first concatenating circuit to receive the first concatenated image, wherein the flow estimation circuit performs a flow prediction on the first concatenated image to generate a first low-resolution image;

a first resolution upscaling circuit, coupled to the flow estimation circuit to receive the first low-resolution image, wherein the first resolution upscaling circuit upscales a resolution of the first low-resolution image to generate a first high-resolution image; and a warping circuit, coupled to the first resolution upscaling circuit to receive the first high-resolution image, wherein the warping circuit warps the first high-resolution image to the high-definition ROI image corresponding to the previous time point to generate a warped image corresponding to the previous time point;

a resolution downscaling circuit, coupled to the warping circuit to receive the warped image and configured to downscale a resolution of the warped image to generate a second low-resolution image;

a second concatenating circuit, coupled to the resolution downscaling circuit to receive the second low-resolution image and coupled to the partition circuit to receive the original ROI image corresponding to the current time point, wherein the second concatenating circuit concatenates the second low-resolution image corresponding to the previous time point and the original ROI image corresponding to the current time point to generate a second concatenated image; and a super-resolution circuit, coupled to the second concatenating circuit to receive the second concatenated image, wherein the super-resolution circuit generates the high-definition ROI image corresponding to the current time point for the stitching circuit, and the super-resolution circuit provides the high-definition ROI image corresponding to the previous time point to the warping circuit.

15. An image processing method for display apparatus, comprising:

receiving a low-resolution image from a host;

tracking a user's gaze to define a region of interest;

partitioning the low-resolution image into an original ROI image corresponding to the region of interest and other region image apart from the original ROI image;

performing a video super-resolution reconstruction on the original ROI image of the low-resolution image to generate a high-definition ROI image; and stitching the high-definition ROI image and the other region image of the low-resolution image to generate a processed image, wherein the region of interest comprises a plurality of sub-regions of interest, the high-definition ROI image comprises a plurality of sub-ROI images, and the image processing method further comprises:

defining the plurality of sub-regions of interest based on a tracking result of the user's gaze, performing the video super-resolution reconstruction on each of the sub-regions of interest in the low-resolution image to generate the plurality of sub-ROI images with different sharpness; and pasting the plurality of sub-ROI images back to the plurality of sub-regions of interest in the low-resolution image to present a multi-layer progressive sharpness effect between the region of interest and another region in the processed image.

16. The image processing method according to claim 15, further comprises:

tracking the user's gaze by an eye tracking circuit of the display apparatus;

receiving the low-resolution image from the host by a partition circuit of the display apparatus;

defining the region of interest by the partition circuit based on a tracking result of the eye tracking circuit;

partitioning the low-resolution image by the partition circuit into the original ROI image corresponding to the region of interest and the other region image apart from the original ROI image;

performing the video super-resolution reconstruction on the original ROI image of the low-resolution image by a video super-resolution reconstruction circuit of the display apparatus to generate the high-definition ROI image; and stitching the high-definition ROI image and the other region image of the low-resolution image by a stitching circuit of the display apparatus to generate the processed image.

17. The image processing method according to claim 16, wherein the original ROI image comprises a plurality of original sub-region images, and the image processing method further comprises:

defining the sub-regions of interest by the partition circuit based on the tracking result of the eye tracking circuit;

performing the video super-resolution reconstruction by the video super-resolution reconstruction circuit on each of the original sub-region images corresponding to the sub-regions of interest to generate the plurality of sub-ROI images with different sharpness; and pasting the plurality of sub-ROI images back to the sub-regions of interest in the low-resolution image by the stitching circuit to present a multi-layer progressive sharpness effect between the region of interest and another region in the processed image.

18. The image processing method according to claim 16, further comprises:

concatenating the original ROI image corresponding to a previous time point and the original ROI image corresponding to a current time point in a channel dimension to generate a concatenated image;

performing the video super-resolution reconstruction by a super-resolution circuit of the video super-resolution reconstruction circuit on the concatenated image to generate a first high-resolution image;

upscaling a resolution of the original ROI image corresponding to the current time point to generate a second high-resolution image; and adding up the first high-resolution image and the second high-resolution image to generate the high-definition ROI image for the stitching circuit.

19. The image processing method according to claim 18, wherein the region of interest comprises a first sub-region of interest and a second sub-region of interest, a first ratio value corresponding to the first sub-region of interest is different from a second ratio value corresponding to the second sub-region of interest, and the image processing method further comprises:

in response to an output of the super-resolution circuit corresponding to the first sub-region of interest, multiplying the output of the super-resolution circuit by the first ratio value and then adding the second high-resolution image to generate the high-definition ROI image; and in response to the output of the super-resolution circuit corresponding to the second sub-region of interest, multiplying the output of the super-resolution circuit by the second ratio value and then adding the second high-resolution image to generate the high-definition ROI image.

20. The image processing method according to claim 16, further comprises:

downscaling a resolution of the high-definition ROI image corresponding to a previous time point to generate a low-resolution image;

concatenating the low-resolution image corresponding to the previous time point, the original ROI image corresponding to the previous time point, and the original ROI image corresponding to a current time point to generate a concatenated image;

performing the video super-resolution reconstruction on the concatenated image to generate a first high-resolution image;

upscaling a resolution of the original ROI image corresponding to the current time point to generate a second high-resolution image; and adding up the first high-resolution image and the second high-resolution image to generate the high-definition ROI image corresponding to the current time point for the stitching circuit.

21. The image processing method according to claim 16, further comprises:

downscaling a resolution of the high-definition ROI image corresponding to a previous time point to generate a first low-resolution image;

concatenating the original ROI image corresponding to the previous time point and the original ROI image corresponding to a current time point in a channel dimension to generate a first concatenated image;

performing a flow prediction on the first concatenated image to generate a second low-resolution image;

warping the second low-resolution image to the first low-resolution image to generate a warped image corresponding to the previous time point;

concatenating the warped image corresponding to the previous time point and the original ROI image corresponding to the current time point to generate a second concatenated image;

performing the video super-resolution reconstruction on the second concatenated image to generate a first high-resolution image;

upscaling a resolution of the original ROI image corresponding to the current time point to generate a second high-resolution image; and adding up the first high-resolution image and the second high-resolution image to generate the high-definition ROI image corresponding to the current time point for the stitching circuit.

22. The image processing method according to claim 16, further comprises:

concatenating the original ROI image corresponding to a previous time point and the original ROI image corresponding to a current time point in a channel dimension to generate a first concatenated image;

performing a flow prediction on the first concatenated image to generate a first low-resolution image;

upscaling a resolution of the first low-resolution image to generate a first high-resolution image; and warping the first high-resolution image to the high-definition ROI image corresponding to the previous time point to generate a warped image corresponding to the previous time point;

downscaling a resolution of the warped image to generate a second low-resolution image;

concatenating the second low-resolution image corresponding to the previous time point and the original ROI image corresponding to the current time point to generate a second concatenated image;

performing the video super-resolution reconstruction on the second concatenated image to generate a second high-resolution image;

upscaling a resolution of the original ROI image corresponding to the current time point to generate a third high-resolution image; and adding up the second high-resolution image and the third high-resolution image to generate the high-definition ROI image corresponding to the current time point for the stitching circuit.

23. The image processing method according to claim 16, further comprises:

concatenating the original ROI image corresponding to a previous time point and the original ROI image corresponding to a current time point in a channel dimension to generate a first concatenated image;

performing a flow prediction on the first concatenated image to generate a first low-resolution image;

upscaling a resolution of the first low-resolution image to generate a first high-resolution image; and warping the first high-resolution image to the high-definition ROI image corresponding to the previous time point to generate a warped image corresponding to the previous time point;

downscaling a resolution of the warped image to generate a second low-resolution image;

concatenating the second low-resolution image corresponding to the previous time point and the original ROI image corresponding to the current time point to generate a second concatenated image; and performing the video super-resolution reconstruction on the second concatenated image to generate the high-definition ROI image corresponding to the current time point for the stitching circuit.

24. An image processing device, comprising:

an eye tracking circuit, configured to track a user's gaze;

a partition circuit, coupled to the eye tracking circuit, wherein the partition circuit receives a low-resolution image from a host, the partition circuit defines a region of interest based on a tracking result of the eye tracking circuit, and the partition circuit partitions the low-resolution image into an original ROI image corresponding to the region of interest and other region image apart from the original ROI image;

a video super-resolution reconstruction circuit, coupled to the partition circuit to receive the original ROI image, wherein the video super-resolution reconstruction circuit performs a video super-resolution reconstruction on the original ROI image of the low-resolution image to generate a high-definition ROI image; and a stitching circuit, coupled to the partition circuit to receive the other region image and coupled to the video super-resolution reconstruction circuit to receive the high-definition ROI image, wherein the stitching circuit stitches the high-definition ROI image and the other region image of the low-resolution image to generate a processed image, wherein the region of interest comprises a plurality of sub-regions of interest, the high-definition ROI image comprises a plurality of sub-ROI images, and the partition circuit defines the plurality of sub-regions of interest based on the tracking result of the eye tracking circuit, the video super-resolution reconstruction circuit performs the video super-resolution reconstruction on each of the sub-regions of interest in the low-resolution image to generate the plurality of sub-ROI images with different sharpness, and the stitching circuit pastes the plurality of sub-ROI images back to the sub-regions of interest in the low-resolution image to present a multi-layer progressive sharpness effect between the region of interest and another region in the processed image.

25. The image processing device according to claim 24, wherein the original ROI image comprises a plurality of original sub-region images, and the video super-resolution reconstruction circuit performs the video super-resolution reconstruction on each of the original sub-region images corresponding to the sub-regions of interest to generate the sub-ROI images with different sharpness.

26. The image processing device according to claim 24, wherein the video super-resolution reconstruction circuit comprises:

a first concatenating circuit, coupled to the partition circuit to receive the original ROI image, wherein the first concatenating circuit concatenates the original ROI image corresponding to a previous time point and the original ROI image corresponding to a current time point in a channel dimension to generate a concatenated image;

a super-resolution circuit, coupled to the first concatenating circuit to receive the concatenated image, wherein the super-resolution circuit performs the video super-resolution reconstruction on the concatenated image to generate a first high-resolution image;

a first resolution upscaling circuit, coupled to the partition circuit to receive the original ROI image, wherein the first resolution upscaling circuit upscales a resolution of the original ROI image corresponding to the current time point to generate a second high-resolution image; and a first summing circuit, coupled to the super-resolution circuit to receive the first high-resolution image and coupled to the first resolution upscaling circuit to receive the second high-resolution image, wherein the first summing circuit adds up the first high-resolution image and the second high-resolution image to generate the high-definition ROI image for the stitching circuit.

27. The image processing device according to claim 26, wherein the region of interest comprises a first sub-region of interest and a second sub-region of interest, and a first ratio value corresponding to the first sub-region of interest is different from a second ratio value corresponding to the second sub-region of interest, in response to an output of the super-resolution circuit corresponding to the first sub-region of interest, the first summing circuit multiplies the output of the super-resolution circuit by the first ratio value and then adds the second high-resolution image to generate the high-definition ROI image; and in response to the output of the super-resolution circuit corresponding to the second sub-region of interest, the first summing circuit multiplies the output of the super-resolution circuit by the second ratio value and then adds the second high-resolution image to generate the high-definition ROI image.

28. The image processing device according to claim 26, wherein the super-resolution circuit comprises:

a first convolutional circuit, coupled to an input end of the super-resolution circuit to receive an input image;

a residual learning circuit string, coupled to an output end of the first convolutional circuit to receive a first convolution result image, wherein the residual learning circuit string performs a residual analysis on the first convolution result image to generate a residual result;

a second convolutional circuit, coupled to an output end of the residual learning circuit string to receive the residual result;

a second summing circuit, coupled to the output end of the first convolutional circuit to receive the first convolution result image and coupled to an output end of the second convolutional circuit to receive a second convolution result image, wherein the second summing circuit adds the second convolution result image to the first convolution result image to generate an addition result image;

an amplifier circuit string, coupled to an output end of the second summing circuit to receive the addition result image, wherein the amplifier circuit string performs a resolution upscaling on the addition result image to generate an enlarged image;

a third convolutional circuit, coupled to an output end of the amplifier circuit string to receive the enlarged image;

a second resolution upscaling circuit, coupled to the input end of the super-resolution circuit to receive the input image, wherein the second resolution upscaling circuit upscales a resolution of the input image to generate a resolution upscaled image; and a third summing circuit, coupled to an output end of the second resolution upscaling circuit to receive the resolution upscaled image and coupled to an output end of the third convolutional circuit to receive a third convolution result image, wherein the third summing circuit adds the third convolution result image to the resolution upscaled image to generate a high-resolution image to an output end of the super-resolution circuit.

29. The image processing device according to claim 28, wherein a residual learning circuit in the residual learning circuit string comprises:

a fourth convolutional circuit, coupled to an input end of the residual learning circuit;

a fifth convolutional circuit, coupled to an output end of the fourth convolutional circuit;

a sixth convolutional circuit, coupled to the input end of the residual learning circuit;

a seventh convolutional circuit, coupled to an output end of the sixth convolutional circuit;

an eighth convolutional circuit, coupled to the output end of the sixth convolutional circuit;

an activation circuit, coupled to an output end of the eighth convolutional circuit;

a multiplication circuit, coupled to an output end of the activation circuit and an output end of the seventh convolutional circuit;

a ninth convolutional circuit, coupled to an output end of the multiplication circuit;

a second concatenating circuit, coupled to an output end of the ninth convolutional circuit and an output end of the fifth convolutional circuit;

a tenth convolutional circuit, coupled to an output end of the second concatenating circuit; and a fourth summing circuit, coupled to an output end of the tenth convolutional circuit and coupled to the input end of the residual learning circuit, wherein an output end of the fourth summing circuit is coupled to an output end of the residual learning circuit.

30. The image processing device according to claim 28, wherein an amplifier circuit in the amplifier circuit string comprises:

an interpolation circuit, coupled to an input end of the amplifier circuit;

a fourth convolutional circuit, coupled to an output end of the interpolation circuit;

a pixel attention circuit, coupled to an output end of the fourth convolutional circuit; and a fifth convolutional circuit, coupled to an output end of the pixel attention circuit, wherein an output end of the fifth convolutional circuit is coupled to an output end of the amplifier circuit.

31. The image processing device according to claim 30, wherein the pixel attention circuit comprises:

a sixth convolutional circuit, coupled to an input end of the pixel attention circuit;

an activation circuit, coupled to an output end of the sixth convolutional circuit; and a multiplication circuit, coupled to an output end of the activation circuit and the input end of the pixel attention circuit, wherein an output end of the multiplication circuit is coupled to an output end of the pixel attention circuit.

32. The image processing device according to claim 26, wherein the super-resolution circuit comprises:

a first convolutional circuit, coupled to an input end of the super-resolution circuit to receive an input image;

a residual learning circuit string, coupled to an output end of the first convolutional circuit to receive a first convolution result image, wherein the residual learning circuit string performs a residual analysis on the first convolution result image to generate a residual result;

an amplifier circuit string, an output end of the residual learning circuit string to receive the residual result, wherein the amplifier circuit string performs a resolution upscaling on the residual result to generate an enlarged image;

a second convolutional circuit, coupled to an output end of the amplifier circuit string to receive the enlarged image;

a second resolution upscaling circuit, coupled to the input end of the super-resolution circuit to receive the input image, wherein the second resolution upscaling circuit upscales a resolution of the input image to generate a resolution upscaled image; and a third summing circuit, coupled to an output end of the second resolution upscaling circuit to receive the resolution upscaled image and coupled to an output end of the second convolutional circuit to receive a second convolution result image, wherein the third summing circuit adds the second convolution result image to the resolution upscaled image to generate a high-resolution image to an output end of the super-resolution circuit.

33. The image processing device according to claim 24, wherein the video super-resolution reconstruction circuit comprises:

a resolution downscaling circuit, configured to downscale a resolution of the high-definition ROI image corresponding to a previous time point to generate a low-resolution image;

a concatenating circuit, coupled to the partition circuit to receive the original ROI image and coupled to the resolution downscaling circuit to receive the low-resolution image, wherein the concatenating circuit concatenates the low-resolution image corresponding to the previous time point, the original ROI image corresponding to the previous time point, and the original ROI image corresponding to a current time point to generate a concatenated image;

a super-resolution circuit, coupled to the concatenating circuit to receive the concatenated image, wherein the super-resolution circuit performs the video super-resolution reconstruction on the concatenated image to generate a first high-resolution image;

a resolution upscaling circuit, coupled to the partition circuit to receive the original ROI image, wherein the resolution upscaling circuit upscales a resolution of the original ROI image corresponding to the current time point to generate a second high-resolution image; and a summing circuit, coupled to the super-resolution circuit to receive the first high-resolution image and coupled to the resolution upscaling circuit to receive the second high-resolution image, wherein the summing circuit adds up the first high-resolution image and the second high-resolution image to generate the high-definition ROI image corresponding to the current time point for the stitching circuit, and the summing circuit provides the high-definition ROI image corresponding to the previous time point to the resolution downscaling circuit.

34. The image processing device according to claim 24, wherein the video super-resolution reconstruction circuit comprises:

a resolution downscaling circuit, configured to downscale a resolution of the high-definition ROI image corresponding to a previous time point to generate a first low-resolution image;

a first concatenating circuit, coupled to the partition circuit to receive the original ROI image, wherein the first concatenating circuit concatenates the original ROI image corresponding to the previous time point and the original ROI image corresponding to a current time point in a channel dimension to generate a first concatenated image;

a flow estimation circuit, coupled to the first concatenating circuit to receive the first concatenated image, wherein the flow estimation circuit performs a flow prediction on the first concatenated image to generate a second low-resolution image;

a warping circuit, coupled to the flow estimation circuit to receive the second low-resolution image and coupled to the resolution downscaling circuit to receive the first low-resolution image, wherein the warping circuit warps the second low-resolution image to the first low-resolution image to generate a warped image corresponding to the previous time point;

a second concatenating circuit, coupled to the warping circuit to receive the warped image and coupled to the partition circuit to receive the original ROI image corresponding to the current time point, wherein the second concatenating circuit concatenates the warped image corresponding to the previous time point and the original ROI image corresponding to the current time point to generate a second concatenated image;

a super-resolution circuit, coupled to the second concatenating circuit to receive the second concatenated image, wherein the super-resolution circuit performs the video super-resolution reconstruction on the second concatenated image to generate a first high-resolution image;

a resolution upscaling circuit, coupled to the partition circuit to receive the original ROI image, wherein the resolution upscaling circuit upscales a resolution of the original ROI image corresponding to the current time point to generate a second high-resolution image; and a summing circuit, coupled to the super-resolution circuit to receive the first high-resolution image and coupled to the resolution upscaling circuit to receive the second high-resolution image, wherein the summing circuit adds up the first high-resolution image and the second high-resolution image to generate the high-definition ROI image corresponding to the current time point for the stitching circuit, and the summing circuit provides the high-definition ROI image corresponding to the previous time point to the resolution downscaling circuit.

35. The image processing device according to claim 24, wherein the video super-resolution reconstruction circuit comprises:

a first concatenating circuit, coupled to the partition circuit to receive the original ROI image, wherein the first concatenating circuit concatenates the original ROI image corresponding to a previous time point and the original ROI image corresponding to a current time point in a channel dimension to generate a first concatenated image;

a flow estimation circuit, coupled to the first concatenating circuit to receive the first concatenated image, wherein the flow estimation circuit performs a flow prediction on the first concatenated image to generate a first low-resolution image;

a first resolution upscaling circuit, coupled to the flow estimation circuit to receive the first low-resolution image, wherein the first resolution upscaling circuit upscales a resolution of the first low-resolution image to generate a first high-resolution image; and a warping circuit, coupled to the first resolution upscaling circuit to receive the first high-resolution image, wherein the warping circuit warps the first high-resolution image to the high-definition ROI image corresponding to the previous time point to generate a warped image corresponding to the previous time point;

a resolution downscaling circuit, coupled to the warping circuit to receive the warped image and configured to downscale a resolution of the warped image to generate a second low-resolution image;

a second concatenating circuit, coupled to the resolution downscaling circuit to receive the second low-resolution image and coupled to the partition circuit to receive the original ROI image corresponding to the current time point, wherein the second concatenating circuit concatenates the second low-resolution image corresponding to the previous time point and the original ROI image corresponding to the current time point to generate a second concatenated image;

a super-resolution circuit, coupled to the second concatenating circuit to receive the second concatenated image, wherein the super-resolution circuit performs the video super-resolution reconstruction on the second concatenated image to generate a second high-resolution image;

a second resolution upscaling circuit, coupled to the partition circuit to receive the original ROI image, wherein the second resolution upscaling circuit upscales a resolution of the original ROI image corresponding to the current time point to generate a third high-resolution image; and a summing circuit, coupled to the super-resolution circuit to receive the second high-resolution image and coupled to the second resolution upscaling circuit to receive the third high-resolution image, wherein the summing circuit adds up the second high-resolution image and the third high-resolution image to generate the high-definition ROI image corresponding to the current time point for the stitching circuit, and the summing circuit provides the high-definition ROI image corresponding to the previous time point to the warping circuit.

36. The image processing device according to claim 24, wherein the video super-resolution reconstruction circuit comprises:

a first concatenating circuit, coupled to the partition circuit to receive the original ROI image, wherein the first concatenating circuit concatenates the original ROI image corresponding to a previous time point and the original ROI image corresponding to a current time point in a channel dimension to generate a first concatenated image;

a flow estimation circuit, coupled to the first concatenating circuit to receive the first concatenated image, wherein the flow estimation circuit performs a flow prediction on the first concatenated image to generate a first low-resolution image;

a first resolution upscaling circuit, coupled to the flow estimation circuit to receive the first low-resolution image, wherein the first resolution upscaling circuit upscales a resolution of the first low-resolution image to generate a first high-resolution image; and a warping circuit, coupled to the first resolution upscaling circuit to receive the first high-resolution image, wherein the warping circuit warps the first high-resolution image to the high-definition ROI image corresponding to the previous time point to generate a warped image corresponding to the previous time point;

a resolution downscaling circuit, coupled to the warping circuit to receive the warped image and configured to downscale a resolution of the warped image to generate a second low-resolution image;

a second concatenating circuit, coupled to the resolution downscaling circuit to receive the second low-resolution image and coupled to the partition circuit to receive the original ROI image corresponding to the current time point, wherein the second concatenating circuit concatenates the second low-resolution image corresponding to the previous time point and the original ROI image corresponding to the current time point to generate a second concatenated image; and a super-resolution circuit, coupled to the second concatenating circuit to receive the second concatenated image, wherein the super-resolution circuit performs the video super-resolution reconstruction on the second concatenated image to generate the high-definition ROI image corresponding to the current time point for the stitching circuit, and the super-resolution circuit provides the high-definition ROI image corresponding to the previous time point to the warping circuit.

* * * * *